(12) United States Patent
Haney et al.

(10) Patent No.: US 12,435,988 B2
(45) Date of Patent: Oct. 7, 2025

(54) USER FEEDBACK INTERFACES FOR MAP LOCATION ENTRY POINTS

(71) Applicant: Apple Inc., Cupertino, CA (US)

(72) Inventors: Aaron D. Haney, San Mateo, CA (US); Alexander B. Cash, Union City, CA (US); Brian J. Andrich, San Francisco, CA (US); Immanuel D. Amirtharaj, Cupertino, CA (US); Michael L. Wiese, Cupertino, CA (US); Nagaraj Hatti Veerarajan, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/846,415

(22) Filed: Jun. 22, 2022

(65) Prior Publication Data

US 2022/0326037 A1 Oct. 13, 2022

Related U.S. Application Data

(63) Continuation of application No. 16/549,435, filed on Aug. 23, 2019, now Pat. No. 11,397,094.

(60) Provisional application No. 62/855,324, filed on May 31, 2019.

(51) Int. Cl.
*G01C 21/36* (2006.01)
*G06F 3/0482* (2013.01)
*H04W 4/021* (2018.01)

(52) U.S. Cl.
CPC ...... *G01C 21/3685* (2013.01); *G01C 21/3611* (2013.01); *G01C 21/3614* (2013.01); *G01C 21/3682* (2013.01); *G06F 3/0482* (2013.01); *H04W 4/021* (2013.01)

(58) Field of Classification Search
CPC ............ G01C 21/3685; G01C 21/3611; G01C 21/3614; G01C 21/3682; G06F 3/0482; G06F 3/04817; G06F 3/0488; H04W 4/021
See application file for complete search history.

(56) References Cited

U.S. PATENT DOCUMENTS

| | | | |
|---|---|---|---|
| 6,427,119 B1 * | 7/2002 | Stefan | G01C 21/34 701/428 |
| 2009/0012707 A1 | 1/2009 | Krage et al. | |
| 2013/0345975 A1 | 12/2013 | Vulcano et al. | |

(Continued)

OTHER PUBLICATIONS

Merriam-Webster, "suggest," 2006. (Year: 2006).*

*Primary Examiner* — Aniss Chad
*Assistant Examiner* — Stephanie T Su
(74) *Attorney, Agent, or Firm* — Invoke

(57) ABSTRACT

A computing device can present a map user interface for users to suggest updates to entry point data for a place, such as points of interest to the user. For an entry point, the computing device can present an entry point indicator that remains in a fixed position on a map view. The user may move the map view as the entry point indicator remains fixed. In response to inputs, the computing device can adjust the map view, so that the fixed entry point indicator lies in a new position relative to the point of interest. The computing device can also insert an entry point indicator on the map view. In response to user inputs, the computing device can associate a location of the inserted entry point indicator with the location of an entry point. The computing device can send the entry point data changes to a server for implementation.

20 Claims, 20 Drawing Sheets

(56) References Cited

U.S. PATENT DOCUMENTS

| | | | |
|---|---|---|---|
| 2018/0087922 A1* | 3/2018 | Wu | G09B 29/106 |
| 2018/0157669 A1* | 6/2018 | Naghdy | G06F 16/35 |
| 2018/0224298 A1* | 8/2018 | Jeong | G01C 21/3664 |
| 2018/0349413 A1 | 12/2018 | Shelby et al. | |
| 2019/0063947 A1* | 2/2019 | Beaurepaire | G01C 21/3423 |
| 2019/0205355 A1* | 7/2019 | Moore | G01C 21/3667 |
| 2020/0363225 A1* | 11/2020 | Lear | G01C 21/3811 |

* cited by examiner

USER FEEDBACK INTERFACES FOR MAP LOCATION ENTRY POINTS

INCORPORATION BY REFERENCE; DISCLAIMER

Each of the following applications are hereby incorporated by reference: application Ser. No. 16/549,435 filed on Aug. 23, 2019; application No. 62/855,324 filed on May 31, 2019. The applicant hereby rescinds any disclaimer of claims scope in the parent application(s) or the prosecution history thereof and advise the USPTO that the claims in the application may be broader that any claim in the parent application(s).

TECHNICAL FIELD

The disclosure generally relates to updating map data for entry points to a location, and more specifically to user interfaces that can used to send updates to entry point data.

BACKGROUND

Many mobile devices provide users with the ability to view virtual maps. These maps may present detailed views for real-world locations, such as roads, buildings, and natural features. Presenting the virtual maps may require stored map data. Over time, the real world may change, and the users may find that the map data may no longer accurately represent the real world.

SUMMARY

In some implementations, a computing device can present a map user interface for a user to suggest updates to entry point data for a place, such as a point of interest to the user. For an entry point, the computing device can present an entry point indicator that remains in a fixed position on a map view of the point of interest. The user may move the map view of the point of interest as the entry point indicator remains fixed. This is so that the user can align the entry point indicator with the location on the point of interest that is, in the user's view, the correct entry point location. In response to inputs, the computing device can adjust the map view, so that the fixed entry point indicator lies in a new position on the map view relative to the point of interest. The computing device can also insert a new entry point indicator on the map view. In response to user inputs, the computing device can associate a location of the inserted entry point indicator with the location of an entry point. The computing device can send the entry point data changes to a server for implementation.

Particular implementations provide at least the following advantages. Particular implementations are beneficial in enabling a map system (e.g., a server-based map service and a user device-based mapping application) to correct errors in entry point locations that are presented by the map system. The map system can receive user-submitted corrections to an entry point location and apply those corrections to keep its map data current. This leads to less erroneous map data which would otherwise mislead or confuse users. Particular implementations are also beneficial because the map system does not need to physically verify entry point locations on a continuous basis (e.g., by periodically dispatching human surveyors). Since users are already visiting these entry points, the map system can crowdsource the users' entry point location knowledge and keep its map data current.

Moreover, there may only be parking lot entrance data for a point of interest (e.g., a building), but no data for entry points to the building. Particular implementations are beneficial because the map system can receive this data from users without needing costly surveys to get missing data for entry points to points of interest.

Having up-to-date entry point data increases the usefulness of the map system. It also avoids time and effort that users might otherwise spend rerouting from the location of the presented entry point to the actual entry point in the real world. The user need not waste extra time trying to determine whether a mapping application presented an entry point accurately. This reduces battery usage, processing cycles, and network data usage on the mobile device as the user uses the mapping application more efficiently. Erroneous map data may cause unsafe situations, such as when a driving user receives incorrect data, tries to route to the correct location, and unnecessarily interacts with the mapping application, taking her attention away from driving. Accordingly, improved map data quality also improves user safety as users spend less time distractedly interacting with the mapping application, whether they are driving or walking on the street.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

Figure 1:
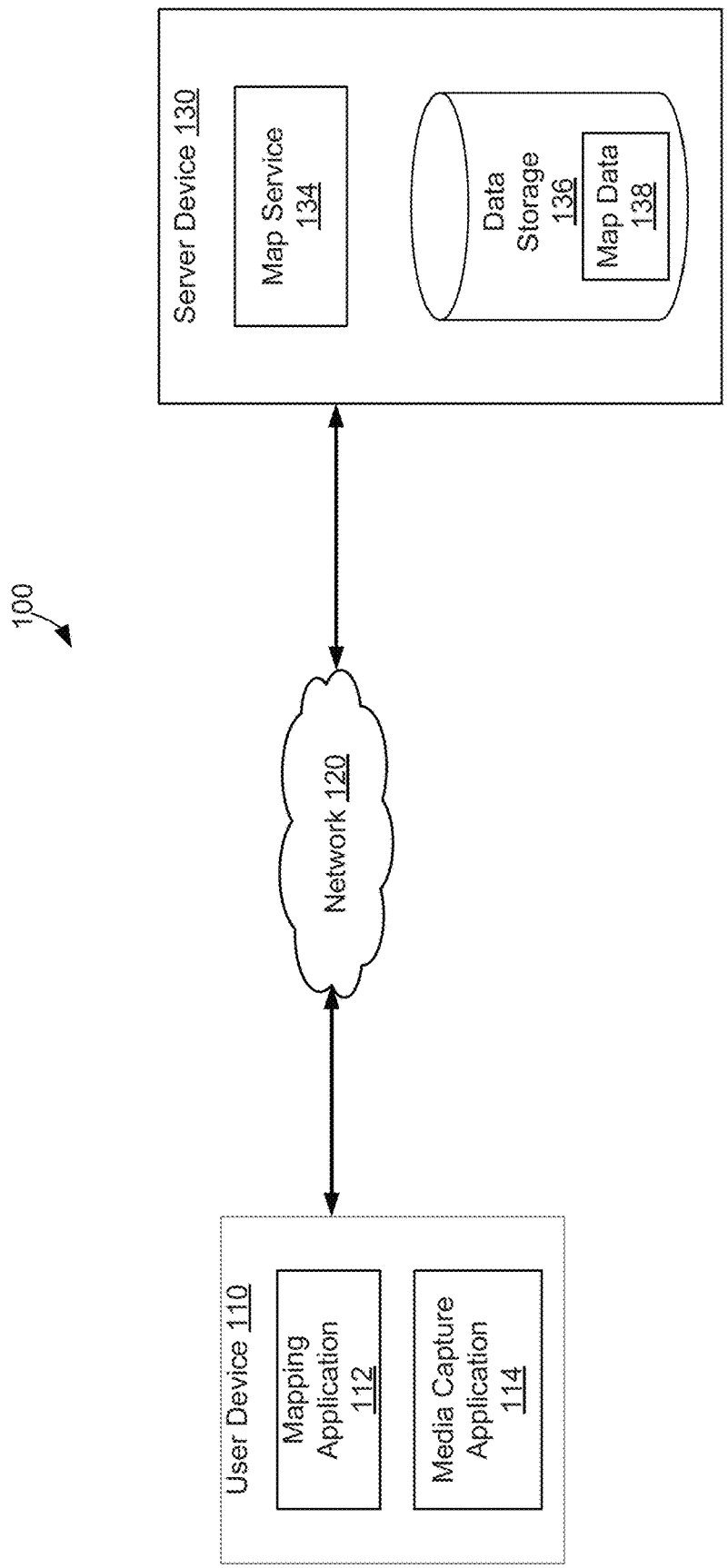
FIG. 1 is a block diagram of an example system for user feedback interfaces for entry point data for a location.

FIG. 1 is a block diagram of an example system 100 for user feedback interfaces for entry point data for a location.

As used herein, "entry point" may refer to any entry or exit point for a particular location. For example, a front door of a store may be considered both an entry point and an exit point. As another example, the entrance to a store's parking lot may also be considered an entry (or entry/exit) point. Entry points may be classified by type. For example, as used herein, the entry point may be of type "destination access". Destination access may refer to the point where a user can actually enter or exit a place, such as a building. For example, a destination access type entry point may refer to the door to the building or a road segment that is adjacent to the door to the building. The entry point may also be of type "entry access". An entry access type entry point for the building may refer to the entrance to a parking lot that is adjacent to the building. Entry points may also be classified by mode. For example, entry points may be classified as pedestrian entry points, driving entry points, mixed driving/pedestrian entry points, or the like.

FIG. 1 shows user device 110. For example, user device 110 can be a laptop computer, desktop computer, smartphone, tablet computer, wearable device, or any other computing device. A user may perform various functions on user device 110 using one or more software-based applications (e.g., mapping application 112 and media capture application 114).

The user may use software-based mapping application 112 on user device 110 to perform various functions. For example, mapping application 112 may be a mapping application with a map view, list view, and several other display and interaction controls. Mapping application 112 may present representations of map items (e.g., metadata, images, descriptions, etc.) and enable the user to, for example, get and view driving directions from one location to another. In some embodiments, mapping application 112 may be configured to present map items on a touch-sensitive display screen of user device 110. Mapping application 112 may respond to touch-based movements by updating the map view. For example, a panning movement to the left may result in the map view moving to the left and showing more of the offscreen map area from the right side of the display screen. As the map view moves, items on the map view (e.g., points of interest, entry points, roads, etc.) may also move according to the user's touch input.

In some embodiments, mapping application 112 may be a mobile application configured to execute on mobile devices (e.g., smartphones or wearable devices). In other embodiments, mapping application 112 may be a desktop application configured to be installed on desktop computing devices (e.g., laptop computers). In still other embodiments, mapping application 112 may be a web-based application that is accessible through, for example, a web browser on any type of computing device. Mapping application 112 may send and receive data to, for example, server device 130 through network 120 (e.g., a local area network, wide area network, the Internet, etc.).

Mapping application 112 may be used to locate particular points of interest. A point of interest may be any location, building, structure, or any enclosed space that can be individually identified. A point of interest may be any point on a map that is of interest to a user of mapping application 112. For example, a user may wish to search for a point of interest (e.g., a restaurant) or get navigation instructions to the point of interest (e.g., directions back to the user's home from some other location). As used herein, the term 'point of interest' may be used to refer to a commercial location, a residential address, or any public location. A point of interest may be a single place or a collection of places. For example, a single restaurant inside a commercial area (such as a strip mall) may be a point of interest. The commercial area may include several stores or business location. The entire commercial area also be referred to as a single point of interest. Mapping application 112 may be configured to distinguish between entry points to the restaurant and entry points to the commercial area. For example, the restaurant may have a front door and a back door. By contrast, the commercial area may have multiple other doors, several parking lot entrances, pedestrian entrances, or the like. The restaurant entry point(s) (e.g., the front door or restaurant parking lot entrance) may also overlap with entry points to the commercial area.

A user may search for a point of interest (POI) by entering one or more POI identifiers into mapping application 112. Mapping application 112 may locate the POI by retrieving map data from, for example, server device 130. The map data may include, for example, POI data that further includes POI boundary data and POI entry point data. POI boundary data may include geographic coordinates representing the POI s boundaries. POI boundary data may include geographic coordinates representing vertices at each corner of the POI. Mapping application 112 may be configured to use the vertices to render a bounded polygon that represents the POI. POI entry point data may refer to geographic coordinates for points along the POI boundary representing entry points. Mapping application 112 may be configured to generate an entry point indicator. An entry point indicator may be an icon or graphic that indicates to a user that there is an entry point to the POI at the location of the entry point indicator on the map view. Mapping application 112 may be configured to present an entry point indicator at each entry point designated in the POI entry point data.

Mapping application 112 may present a map view that includes a representation of the POI. For example, the POI may be presented in a virtual map view that shows the boundaries of the POI, POI labels, and surrounding locations. Mapping application 112 may present additional information, such as the POI address, business hours related to the POI, POI images, user reviews, or the like.

In some embodiments, a user may request directions to the POI. Mapping application 112 may be configured to present directions to the POI, including presenting a destination location indicator for the POI on a map user interface.

In some embodiments, mapping application 112 may present the destination location indicator at the center of the POI on the map view. In other embodiments, mapping application 112 may present the destination location indicator at an entry point to the POI. In other words, mapping application 112 may determine an entry point to the POI as a destination for the route to the POI requested by the user. The POI may have multiple entry points. As an example, mapping application 112 may be configured to select the entry point that is closest to the last maneuver point on the navigated route, so that the last leg of the route is shortest. As another example, mapping application 112 may be configured to present a primary entry point for a POI regardless of how long the last leg of the route becomes.

As noted above, real-world conditions may change over time, necessitating changes to the map data that is used to present the POI. There may be construction activity at the POI resulting in an entry point being moved from one location to another. For example, the door to a restaurant may be moved from the north wall to the east wall of the restaurant. An additional entry point may be created where none previously existed. For example, the restaurant may add a new entrance for customers with carryout orders only. An entry point may be temporarily or permanently closed. For example, the restaurant may later close down the separate entrance for carryout orders so that all customers must use a single main entrance to get inside.

As described above, mapping application 112 may rely on map data received from, for example, server device 130 to present a POI on a map view. When real-world circumstances change, the map data used by mapping application 112 may fall out of date. A user of mapping application 112 may be able to review the map data being presented, such as presentation of the POI, and compare it to the real world. Accordingly, in some embodiments, mapping application 112 presents the user with controls to provide feedback on the map data being presented.

For example, a user may navigate to a POI and reach the destination point on the route presented by mapping application 112. As mentioned above, the destination may be marked by a destination location indicator on the map view of mapping application 112. The user may reach the location marked by the destination location indicator and notice that the location is not an entry point to the POI. Instead, the destination location indicator may be indicating a stretch of road, or a wall. So, the user may notice that the entry point presented by the mapping application 112 for a POI is in the wrong location. It may be that there was previously an entry point at that location, but subsequent construction or other changes may have led to the entry point being closed or relocated. The user may wish to provide an edit or update to the map data that mapping application 112 is using.

As another example, the user may reach the destination on the route (i.e., an entry point to the POI) and notice a new entry point. For example, mapping application 112 may present a destination location indicator to an entry point on the west side of a large building, such as a shopping mall. The user may be unable to park on the west side (e.g., because there is no parking area there) and may instead need to drive around to park on, for example, the east side of the shopping mall. There, the user may notice that an entry point also exists on the east side. In other words, mapping application 112 did not initially present the east side entry point that would have been more convenient. The user may wish to provide an addition to the map data being used by mapping application 112.

In some embodiments, mapping application 112 may present controls for a user to suggest edits to the entry point data for a POI. For example, mapping application 112 may present a control where the user can indicate the correct location for an entry point for the POI or indicate the location of a new entry point for the POI. In some embodiments, mapping application 112 may be configured to present a map-based user interface (UI) where the user can select an entry point, relocate the entry point on the map UI to the correct location, and submit the new location to, for example, server device 130.

In some embodiments, mapping application 112 presents the map UI in response to a user request to submit an entry point edit for a POI. The map UI may present an entry point indicator for each of the entry points for the POI. The user may select one entry point indicator for which to provide an edit. In one embodiment, mapping application 112 may be configured to then zoom in to the selected entry point indicator and pan the map UI so that the selected entry point indicator is in the center of the map UI with some of the surrounding areas being presented. In another embodiment, mapping application 112 may not zoom or pan the map so that the selected entry point indicator remains in the same position as before.

In some embodiments, mapping application 112 may be configured to hold the entry point indicator in a static or stationary position and permit the user to move the underlying map UI. As described above, mapping application 112 may be configured to move the map UI in response to a user touch input. However, on the map UI for entry point edits, the selected entry point indicator may be maintained in a static position (e.g., in the center of the map UI) even if the user provides touch inputs to move the map UI. For all other map features on the map view, mapping application 112 may be configured to respond to user touch inputs by moving the map features proportionally to the user touch input. For example, mapping application 112 may pan the map UI to the left in response to a user touch input panning the map to the left, even as the entry point indicator remains static and does not pan to the left. As a result, the user is able to reposition the entry point indicator on the map UI. For example, an entry point indicator may present in a first position on the map UI. When user pans the map UI, mapping application 112 pans the map UI but not the entry point indicator. In effect, mapping application 112 repositions the entry point indicator relative to the rest of the map.

For example, a user may select an entry point indicator. The selected entry point indicator may represent an entry point on the south wall of a POI. The user may have observed that the corresponding entry point is further east of where the entry point indicator indicates the entry point to be. The user may then pan the map to the left. In response, mapping application 112 may move the map UI to the left but not move the entry point indicator, keeping it static. As a result, the entry point indicator moves to a more rightward or eastward position on the south wall of the POI. The user may provide confirmation once the user perceives the entry point indicator to be in the correct position on the map view.

As described above, the user may notice an entry point to a POI in the real world that was not presented by mapping application 112 when presenting a route to the POI. For such situations, mapping application 112 may be configured to enable the user to submit entry point additions for a POI. Mapping application may be configured to enable the user to add an entry point using the map UI that was described previously. In response to the user request to add an entry point, in some embodiments, mapping application 112 presents the map UI with the POI centered on the display screen. In addition, mapping application 112 may present a new entry point indicator to position on the map UI. In some embodiments, the new entry point indicator is also centered on the display screen.

In some embodiments, mapping application 112 may be configured to hold the new entry point indicator in a static or stationary position and permit the user to move the underlying map UI, similar to the entry point editing scenario. Accordingly, the new entry point indicator may remain static (e.g., in the center of the map UI) as mapping application 112 moves the map in response to the user touch input. For example, the user may have determined that the POI in the real world has a new entry point on the north side of the POI. Mapping application 112 may present a new entry point indicator in the center of the POI. The user may pan the map view downward so that the presentation of the POI moves downward (or southward) as the new entry point indicator remains static. In effect, the entry point indicator moves to a more upward (or northward) position relative to the POI. The user may provide confirmation once the new entry point indicator is positioned on the north side of the POI on the map view.

In some embodiments, media capture application 114 may be configured to capture visual media (e.g., photos or videos) that are associated with an entry point. For example, the user may take photos or video of the entry point while submitting an entry point edit or addition. The user may take photos indicating the correct location of the entry point. The user may add text to the image that provides additional information. For example, the user may caption an image with "This is the correct location of the door to Big Box Store. Your map shows it 100 feet to the west. Please fix." The user may take a video showing the correct location of the entry point relative to the location presented by mapping application 112. Media capture application 114 may be configured to store the user-created photos and videos. Media capture application 114 may also be configured to generate location data associated with the image. For example, media capture application 114 may generate metadata for visual media in an exchangeable image file (EXIF) format. The EXIF format may provide tags for location information.

In some embodiments, media capture application 114 may be configured to geotag or geocode the captured media with a location that is less accurate than the actual location of capture. Media capture application 114 may be configured to do this to protect the user's privacy so that the user's actual location of when the media were captured is not recorded. For example, media capture application 114 may have the capability to determine the location of mobile device 110 to an accuracy of, for example, one meter. However, media capture application 114 may be configured to geocode the captured media with a lesser degree of accuracy. For example, media capture application 114 may geotag a photo with a location that is only accurate to within 20 meters. In some embodiments, media capture application 114 may send the media data along with the location data to mapping application 112.

In other embodiments, media capture application 114 may provide the visual media to mapping application 112 for geocoding. In these embodiments, media capture application 114 may provide timestamp data indicating when the media were captured. Mapping application 112 may be configured to identify the location of mobile device 110 at the provided timestamp. Mapping application 112 may then tag or geocode the media with the location of capture. As with media capture application 114, mapping application 112 may be configured to determine the media capture location with a lesser degree of accuracy than is possible for mapping application 112, in order to protect the user's privacy.

In some embodiments, mapping application 112 may be configured to determine the new location of the entry point so as to provide it to, for example, server device 130. In one embodiment, mapping application 112 may be configured to determine the new location of the entry point by identifying the geographic location corresponding to the point on the map to which the user moved the entry point indicator. For example, the new location may correspond to a certain set of geographic coordinates, Mapping application 112 may be configured to identify that set of geographic coordinates as a new or candidate location for the entry point.

In another embodiment, mapping application 112 may translate the user-submitted inputs into location information that can be used to update map data (e.g., at server device 130). For example, the user may submit an entry point edit during which the user moves the map on the map UI presented by mapping application 112 on the display screen of mobile device 110. For example, the user may move the map by ten pixels on the display screen. Each pixel may correspond to a certain distance in geographic coordinate form. For example, each pixel may represent $1/1000^{th}$ of a degree of latitude or longitude. Accordingly, mapping application 112 may be configured to translate the ten-pixel movement into $1/100^{th}$ of a degree of latitude or longitude according to the direction of the user's movement.

In some embodiments, mapping application 112 may be configured to generate an entry point update report. The entry point update report may include user-submitted an entry point edit and/or addition for an entry point for a POI. The entry point update report may include edits or additions for multiple entry points for multiple POIs. In the entry point update report, mapping application 112 may be configured to include one or more POI identifiers and entry point identifiers. Mapping application 112 may also be configured to include location data. For example, in the case of an entry point edit, mapping application 112 may include the current location (which may have fallen out of date) of the entry point as being currently presented by mapping application 112. Mapping application 112 may also include the candidate location provided by the user (which may be correct per the user) of the entry point. Mapping application 112 may also be configured to present the entry point type and/or the entry point mode in the entry point update report. Mapping application 112 may be configured to include the visual media captured by media capture application 114 in the entry point update report. Mapping application 112 may include the metadata (e.g., EXIF data, timestamp data) for the visual media in the entry point update report. In some embodiments, mapping application 112 sends the generated entry point update report to server device 130.

Server device 130 may include data storage 136. Server device 130 may store map data 138 in data storage 136. More broadly, data storage 136 can include any data that may be indicative of map geometry, road network data, buildings, content about map objects, object names (e.g., road names, building names), or the like. Server device 130 may include map service 134. Map service 134 may be configured to provide map data to mapping application 112. For example, map service 134 may be configured to retrieve map data 136 from data storage 136. Map service 134 may also be configured to analyze received entry point update reports.

For example, map service 134 may be configured to analyze the entry point update report to determine what entry point updates have been indicated. Map service 134 may validate the entry point update report to ensure it contains useful data. For example, for an entry point edit, map service 134 may determine whether the suggested entry point location is within a threshold distance of the currently known entry point location. As another example, map service 134 may determine whether the suggested entry point location (e.g., the location of a new entry point or an edit showing the correct location) corresponds to the location of the POI. If, for example, the distance between the suggested entry point location and the boundaries of the POI exceeds a threshold, map service 134 may be configured to reject the entry point update. Similarly, map service 134 may be configured to analyze the media data to determine whether the capture location provided for the media is within a threshold distance of the POI location.

Map service 134 may also be configured to determine if there are prior entry point update reports that involve the currently reported entry point. Map service 134 may be configured to validate (e.g., for a human operator) that the current entry point update report matches a threshold number of existing entry point update reports that cite the same entry point. In other words, a number of users may have reported that mapping application 112 is presenting incorrect data for this entry point.

Map service 134 may receive entry point update reports from multiple different types of devices (e.g., mobile devices, desktop computing devices, smartwatches etc.). These devices may use different operating systems and generate different types of files for the entry point update report. Similarly, mapping application 112 may present the map UI through another application (e.g., another mobile application or a web browser) that may generate the entry point update report in its own format. Map service 134 may also be configured to format the entry point update report into a standard format that is readable by another device or a human operator.

Figure 2:
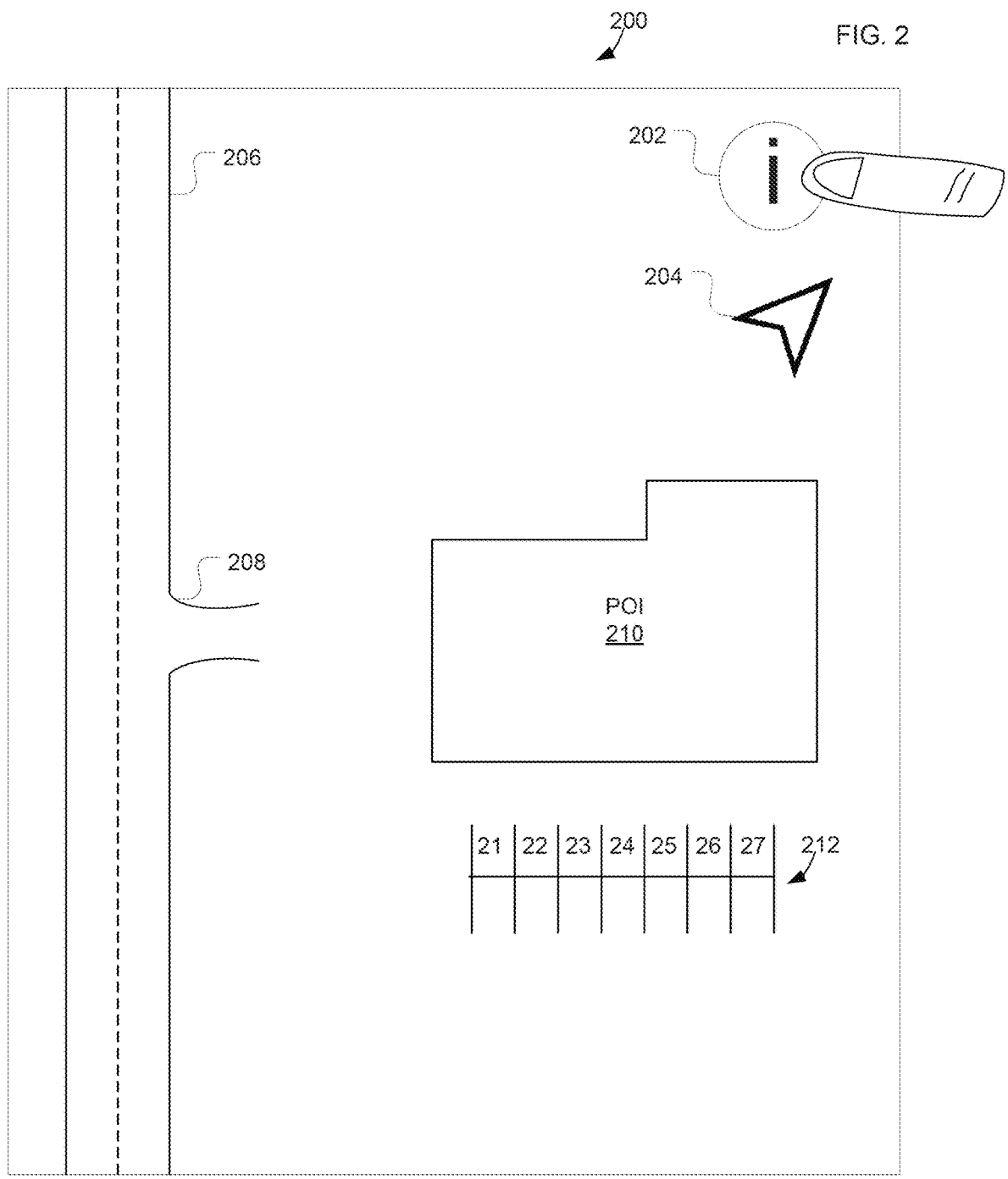
FIG. 2 is a map view that may be used as a user feedback interface for entry point data for a location.

FIG. 2 shows a map view 200 that may be used for presenting user feedback interfaces for entry point data for a location. Map view 200 may be presented on a touch-sensitive display screen of, for example, mobile device 110. As shown, map view 200 shows a map view of a geographical area with multiple map features. Map view 200 also shows a number of interactive controls that can be used to interact with map view 200.

FIG. 2 shows feedback control 202. Feedback control 202 may be an interactive control such as an icon, button, switch, checkbox, or the like. If activated, feedback control 202 may be configured to present one or more options for enabling a user to provide feedback on the currently presented map.

FIG. 2 shows location control 204. A user may interact (e.g., by providing touch input) with location control to determine the user's own location. This may be useful if the user expects to reach an entry point at the end of a route but instead ends up in an unexpected location. For example, a user may open mapping application 112 and search for a POI. The user may receive a route to the POI using mapping application 112. Mapping application 112 may present a destination location indicator to which the user navigates. On reaching the location indicated by the destination location indicator, the user may determine that that location is not an entry point to the POI (e.g., because the entry point has moved, and the map data used by mapping application 112 is out of date). The user may travel to an entry point. From the entry point, the user can interact with location control 204. Location control 204 may be configured to update map view 200 to present a location indicator for the user's current location. Location control 204 may be configured to assist the user in providing the user's current location (e.g., near an entry point) so that the user can submit, for example, an entry point edit.

FIG. 2 shows road 206. As an example, a user may search for POI 210. The search result may be presented as map view 200. Map view 200 may present POI 210 as well as a limited set of surrounding features, such as road 206. Road 206 may represent a road. Road 206 may be connected to parking lot entrance 208. A user may request a route to POI 210. Mapping application 112 may be configured to present a route to POI 210 that includes travel on road 206, with an exit on entrance 208.

FIG. 2 shows POI 210. As an example, POI 210 may be a large building structure, such as an indoor shopping mall. As noted above, mapping application 112 may be configured to present POI 210 using map view 200. Mapping application 112 may also be configured to present a route to POI 210 using a route presentation (not shown). In some embodiments, POI 210 represents a point of interest bounded by one or more walls or boundaries. As described earlier, the term "entry point" is used to describe any location where a person can enter or exit the boundaries of a point of interest. In some embodiments, POI 210 may have multiple entry points along the boundaries of POI 210. For example, the shopping mall represented by POI 210 may have multiple driving users and pedestrians can enter and exit the shopping mall or shopping mall parking lots. Additionally, mapping application 112 may also be configured to treat entrance 208 as an entry point to POI 210. For example, where a user requests a route to POI 210, mapping application 112 may present a destination location indicator at the location of entrance 208. Similarly, mapping application 112 may present walking directions to a pedestrian traveling to POI 210, with a destination location indicator at entrance 208. The pedestrian may walk along road 206 and enter through entrance 208 to reach POI 210.

FIG. 2 shows parking lot 212. Parking lot 212 is adjacent to POI 210. For example, parking lot 212 may be a shopping mall parking lot. A driving user may park her vehicle in parking lot 212 to reach POI 210. For illustration, some of the parking spaces of parking lot 212 are numbered using numbers 21-27.

As shown in FIG. 2, a user interacts with feedback control 202. For example, the user may view map view 200 upon reaching POI 210. The user may have followed routing directions to POI 210 that culminate in a destination location indicator corresponding to a particular entry point. For example, the user may have navigated to a particular store in the indoor shopping mall. The user may elect to park close to the entry point presented by mapping application 112. However, the entry point may now be at a different location some distance away. The user may need to move her car to park at a new location or walk some distance to reach the actual entry point. Accordingly, the user may elect to use feedback control 202 to provide an entry point edit.

Figure 3:
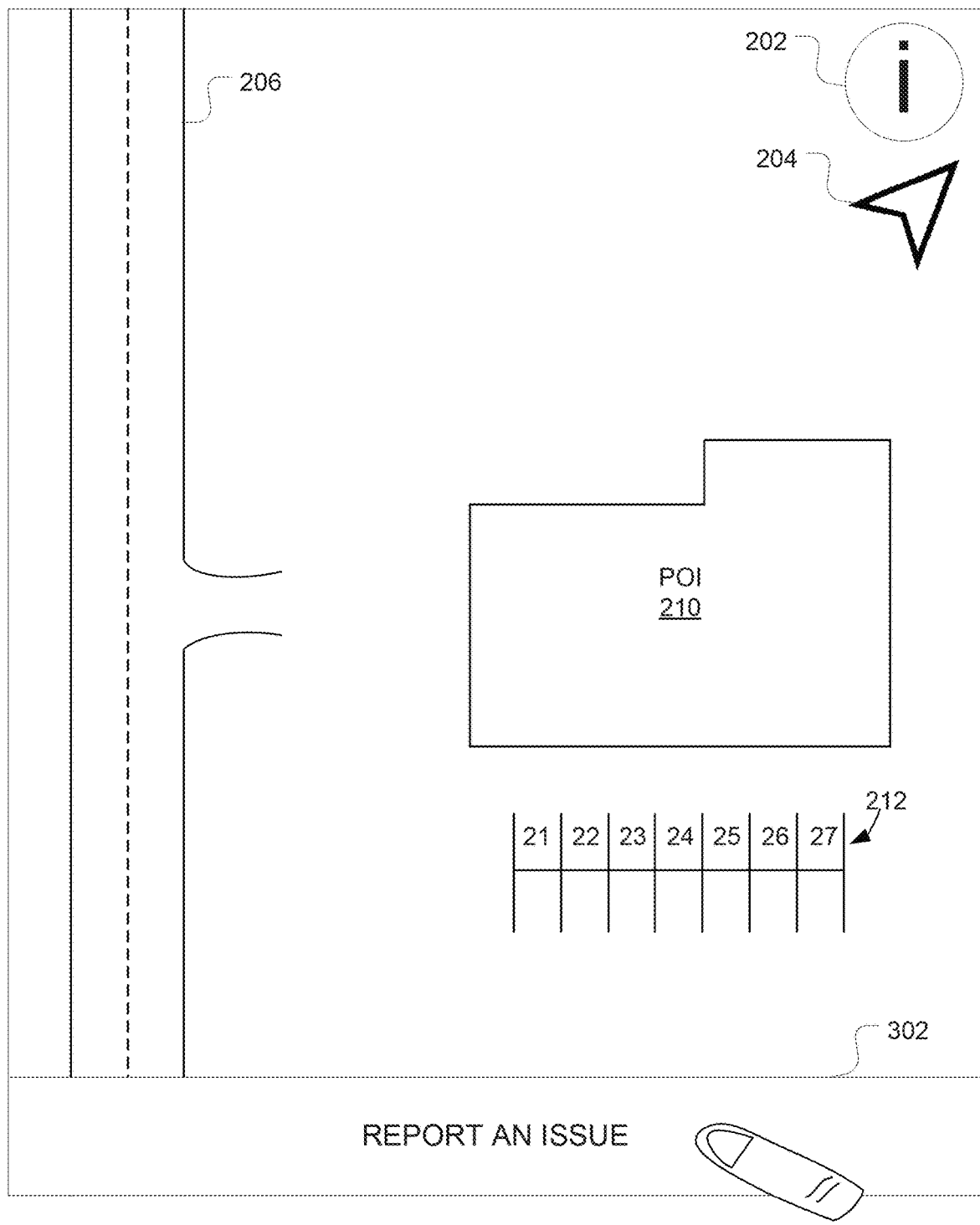
FIG. 3 is an updated map view that may be used as a user feedback interface to update entry point data for a location.

FIG. 3 shows an updated map view 300 that may be used for providing user feedback interfaces for entry point data for a location. In response to the user interacting with feedback control 202, mapping application 112 may be configured to present interactive message 302 added to map view 200. In some embodiments, there may be limited space to present interactive message 302 on every map view, such as on mobile device display screens. Accordingly, mapping application 112 may be configured to present message 302 only after the user first interacts with feedback control 202. In other embodiments, interactive message 302 may be presented on each map view so that the user can quickly proceed to providing feedback. Mapping application 112 may be configured to remove interactive message 302 under certain circumstances. For example, mapping application 112 may automatically remove interactive message 302 after a certain period of time. As another example, mapping application 112 may remove interactive message 302 if the user interacts with some other part of map view 200. FIG. 3 shows that the user interacts with interactive message 302.

Figure 4:
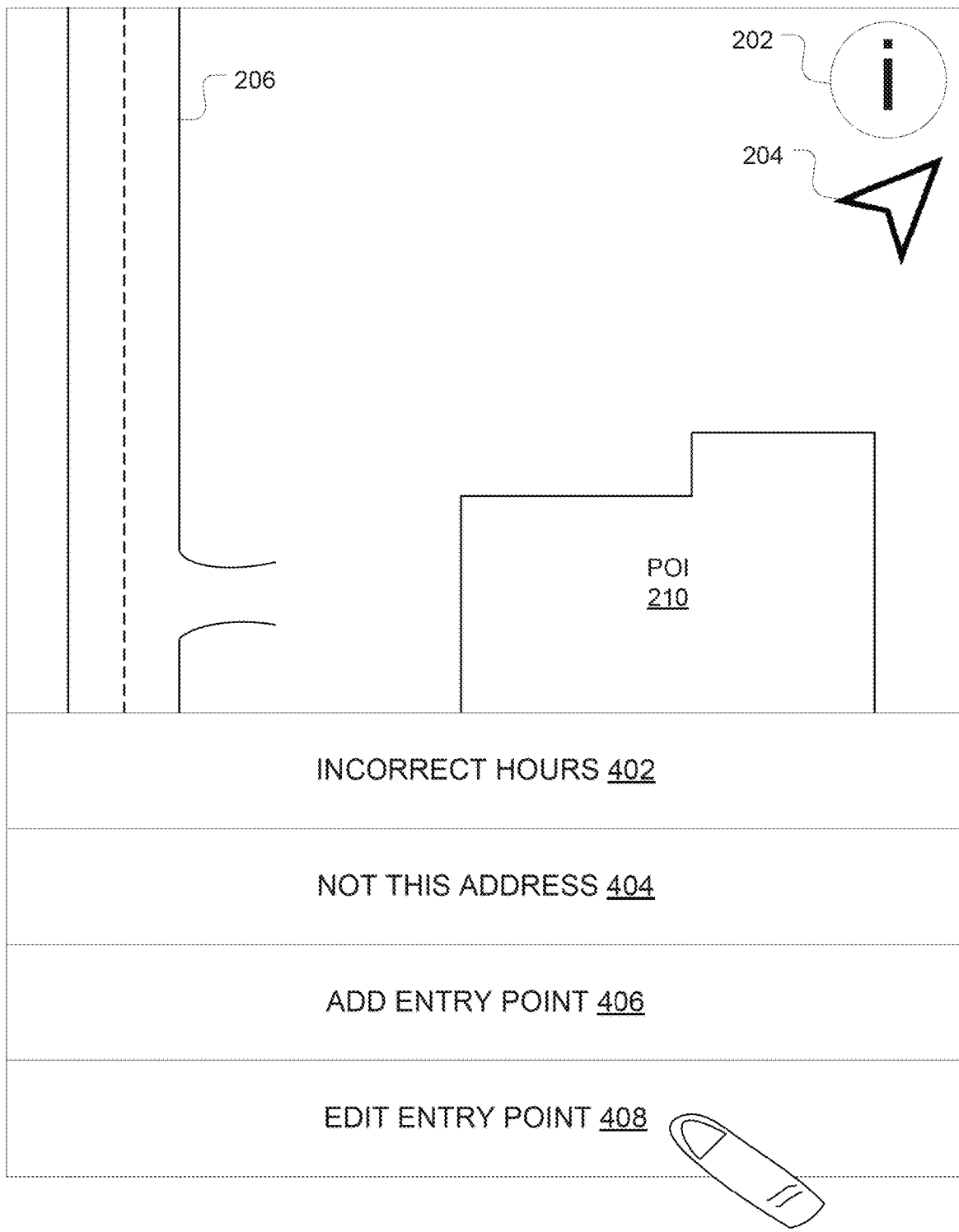
FIG. 4 is a map view by which a mapping application may be configured to present additional interactive controls in response to receiving user input.

FIG. 4 shows map view 400 by which mapping application 112 may be configured to present additional interactive controls in response to receiving user input on interactive message 302. In some embodiments, mapping application 112 presents incorrect hours message 402. A user can provide touch input on incorrect hours message 402 to indicate that mapping application 112 provided incorrect business hours for POI 210. For example, the user may arrive at a certain time at POI 210 and expect POI 210 to be open for business based on the business hours presented by mapping application 112. If POI 210 is closed for business at that time, the user may provide feedback stating that the provided business hours were incorrect. Mapping application 112 may be configured to receive different business hours information.

Similarly, FIG. 4 shows incorrect address control 404. Incorrect address control 404 may be used where the user arrives at an unexpected location after navigating a route presented by mapping application 112. For example, the user may have requested routing directions to a particular address but ended up at an unexpected location that shows a different address in the real world. Mapping application 112 may be configured to receive corrected address information.

FIG. 4 shows add entry point control 406. As described later with respect to FIGS. 12-16, mapping application 112 may present several interfaces for a user to provide information for a new entry point to a POI. As shown in FIG. 4, the user provides touch input on edit entry point control 408. For example, the user may arrive at POI 210 and determine that a presented destination location indicator did not correspond to an entry point at the real world location of POI 210.

Figure 5:
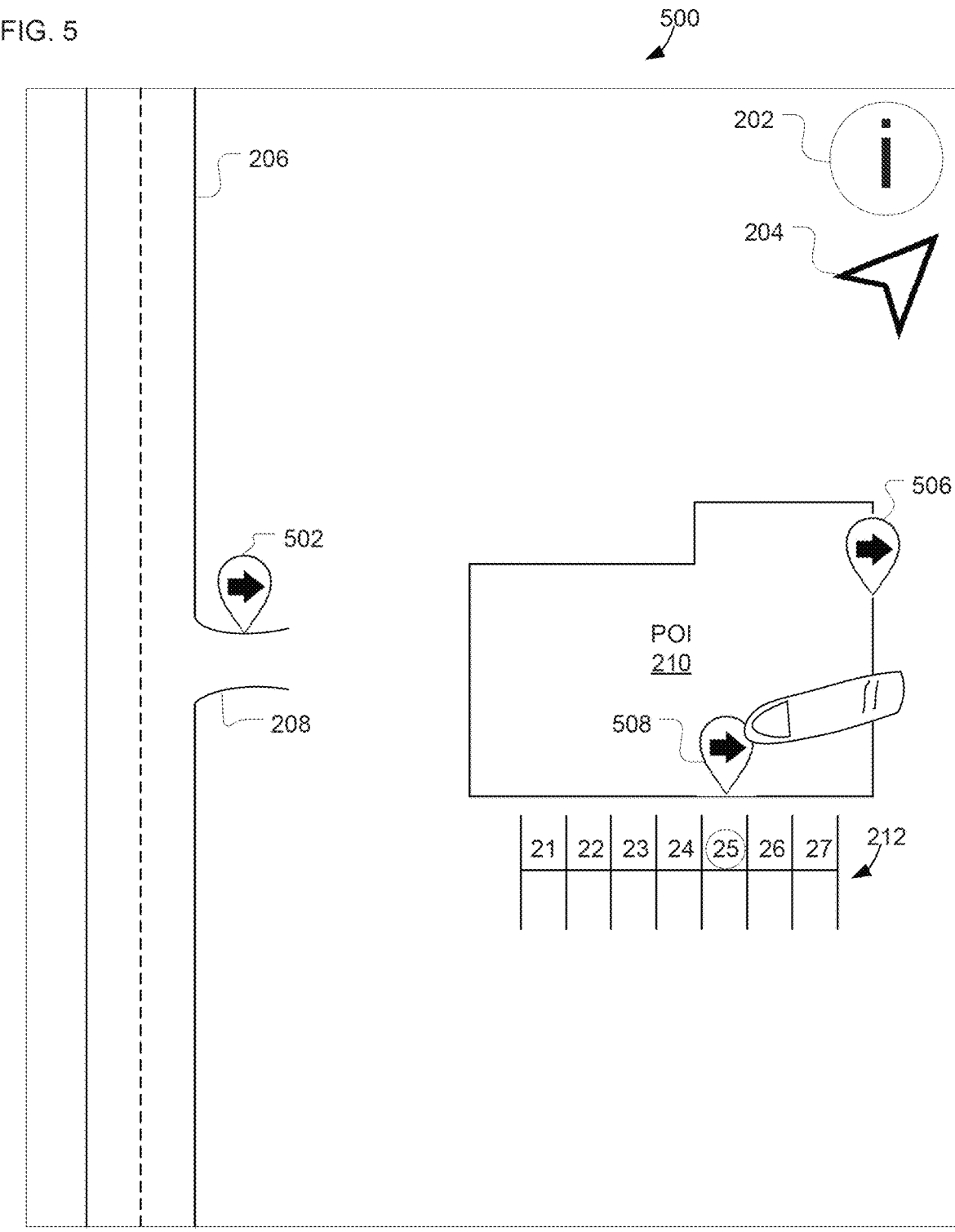
FIG. 5 is a map view that shows entry points to a point of interest.

FIG. 5 shows a map view 500 that shows entry points to a point of interest. In response to the user interaction with edit entry point control 408, mapping application 112 may be configured to present map view 500. Mapping application 112 may be configured to show all of feedback control 202, location control 204, road 206, POI 210, and parking lot 212. In addition, mapping application 112 may be configured to show entry point indicators for each entry point to POI 210. In some embodiments, each entry point indicator may be interactive. A user may tap on an entry point indicator to provide edits for the corresponding entry point. FIG. 5 shows entry point indicator 502. Entry point indicator 502 may correspond to parking lot entrance 208, as described above with respect to FIG. 2. In some embodiments, mapping application 112 may present entry point indicator 502 as a vehicle entrance for POI 210. Mapping application 112 may present entry point indicator 502 as a destination location indicator for a driving route to POI 210.

Map view 500 also shows entry point indicator 506. For example, entry point indicator 506 may represent an entry point on the eastern wall or boundary of the shopping mall represented by POI 210.

Map view 500 also shows entry point indicator 508. Entry point indicator 508 may refer to an entry point that is adjacent to parking lot 212. More specifically, entry point indicator 508 may be presented next to parking space 25 in map view 500. In other words, a user wishing to enter the shopping mall using entry point indicator 508 may wish to park at parking space 25. For illustration purposes, parking space 25 is circled in FIG. 5. As shown in FIG. 5, the user may provide touch input on entry point indicator 508.

Figure 6:
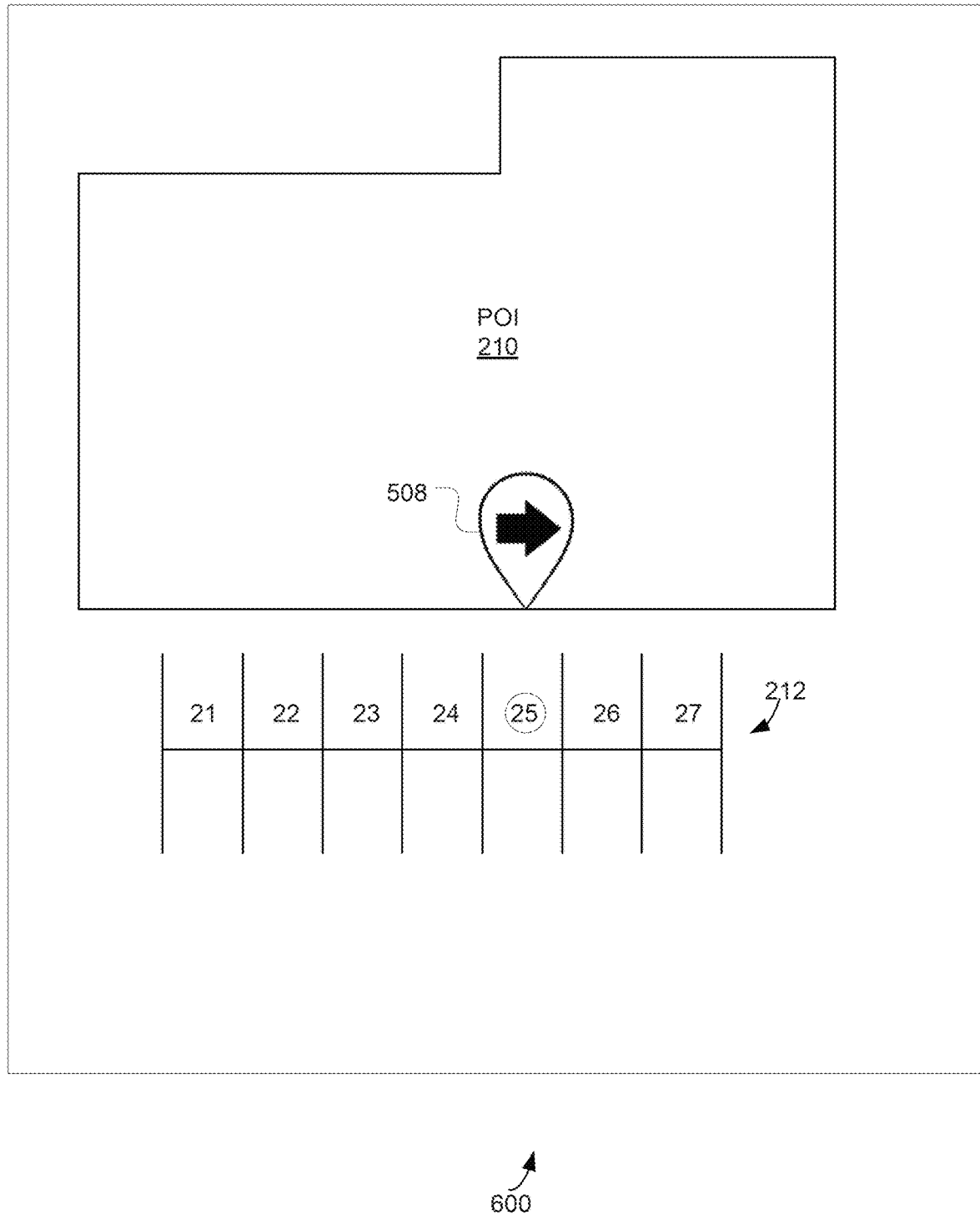
FIG. 6 is a map view that illustrates how the mapping application presents a focused presentation of the selected entry point.

FIG. 6 is a map view 600 that illustrates how mapping application 112 presents a focused presentation of the selected entry point. As shown in FIG. 6, mapping application 112 may respond to the user touch input on entry point indicator 508 by presenting map view 600. In some embodiments, mapping application 112 responds to the selection of entry point indicator 508 by zooming in on the entry point indicator 508 and centering entry point indicator 508 at the center of map view 600. In some embodiments, mapping application 112 removes other entry point indicators and shows only the selected entry point indicator 508 in a zoomed in and centered presentation. As shown in FIG. 6, mapping application 112 generates map view 600 that zooms in on and centers on entry point indicator 508. Also, mapping application 112 removes the presentation of all other entry point indicators. However, other map features may still be presented, such as parking lot 212.

In other embodiments, when map view 600 is zoomed in and centered on entry point indicator 508, other entry point indicators may still be presented. For example, one or more other entry point indicators may be close enough to still be presented even at the particular zoom level and even if the selected entry point indicator is centered on the screen.

In some other embodiments, mapping application 112 only centers map view on entry point indicator 508. In still other embodiments, mapping application 112 does not center on or zoom in on entry point indicator 508 such that entry point indicator 508 appears in the same position on map view 600 as on map view 500. In some embodiments, entry point indicator 508 may be emphasized or distinguished from the other entry point indicators. For example, mapping application 112 may respond to the selection by changing the color of entry point indicator 508. Mapping application 112 may emphasize the color or shade or brightness of entry point indicator 508 and/or deemphasize the other entry point indicators in a similar manner. Mapping application 112 may also remove all entry point indicators from map view 600 except for the selected entry point indicator 508. Again, for illustration purposes only, parking space 25 is circled on FIG. 6.

Figure 7:
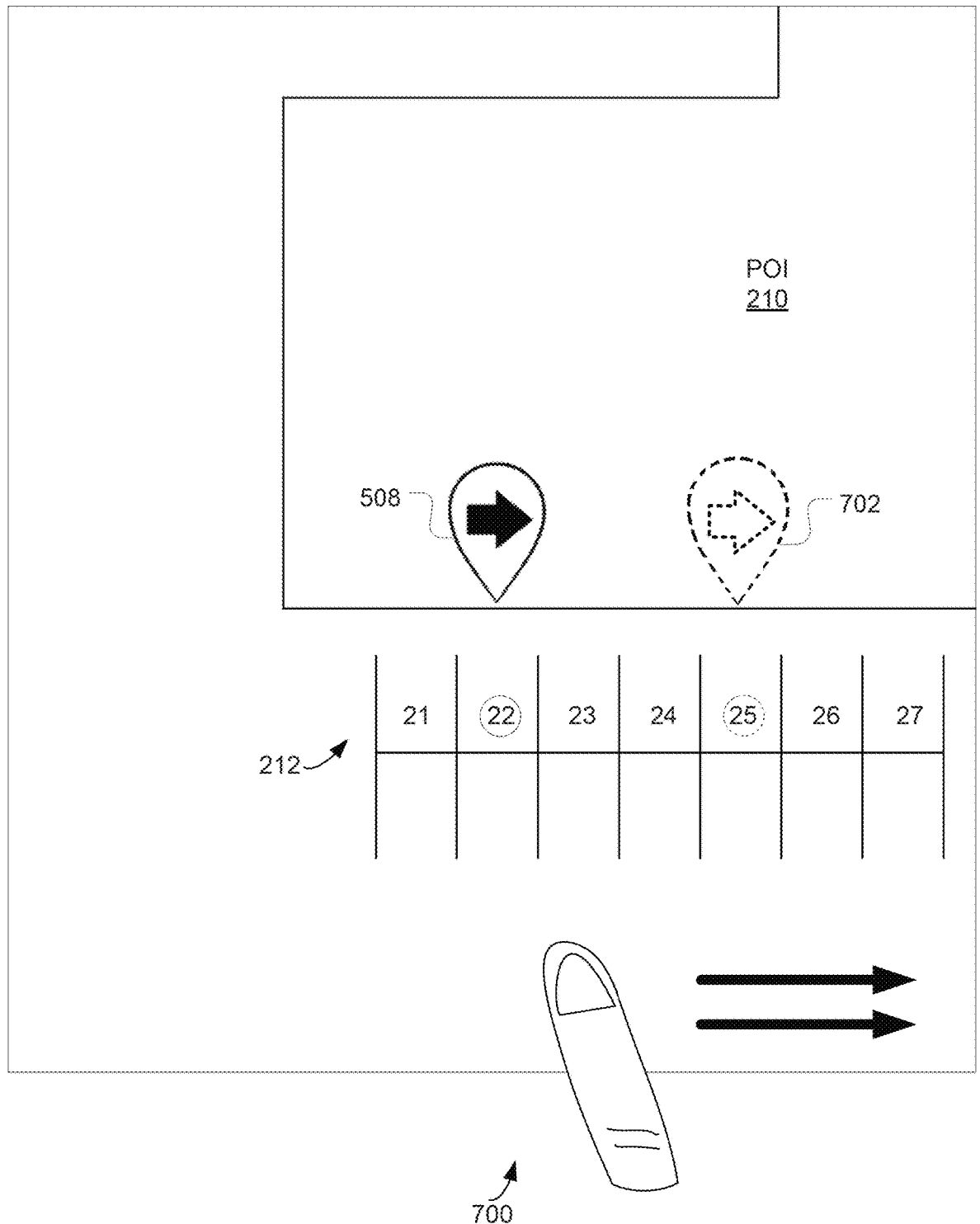
FIG. 7 is a map view showing a mapping application causing the map view to move in response to user input while an entry point indicator remains static.

FIG. 7 is a map view 700 showing a mapping application causing the map view to move in response to user input while an entry point indicator remains static. FIG. 7 is similar to FIG. 6 in that map view 700 is zoomed in on and centered on entry point indicator 508.

As described earlier, mapping application 112 may be configured to generate map view 700 to keep the selected entry point indicator 508 in a stationary position. Mapping application 112 may configure map view 700 to be movable in response to user touch input. For example, the user may pan map view 700, use two fingers to zoom in or out on map view 700, double tap a location to zoom in on that location on map view 700, or the like. However, during all of these or similar touch operations, entry point indicator 508 does not move from the center of map view 700. For example, if map view 700 is panned to the right, every map feature on map view 700 moves to the right, scrolling some of the map view off screen to the right of the display screen while bringing in additional map features in from the left of the display screen. But entry point indicator 508 may remain stationary at the center of map view 700.

FIG. 7 shows that the user moves map view 700 using a touch input. As described above, map view 700 may present on a touch-sensitive display screen. The user may move map view 700 by touching any portion of map view 700. The user may move map view using multiple touch inputs. In each instance, entry point indicator 508 may remain stationary. This may be advantageous compared to methods involving moving entry point indicator 508. This is because moving the entry point indicator may require the user to cover the entry point indicator with the user's finger. Such a method may be less accurate and also take more time to get right because the user will likely move the entry point indicator a little bit, take her finger off the display screen to see the entry point indicator's position, then review to check whether the entry point indicator is in the correct place, and touch to adjust, again covering the entry point indicator with her finger. However, FIG. 7 illustrates that the user can move map view 700 without having to cover entry point indicator 508 with the user's finger. The user can, for example, touch and drag map view 700 using a corner or border region of map view 700. Since entry point indicator 508 need not be obscured by the user's finger, the user can visually verify when entry point indicator 508 is in the correct position and confirm the entry point edit.

As shown in FIG. 7, the user moves map view 700 to the right. For example, a user may determine that entry point indicator 508 represents an entry point that is to the left of the presented location. Accordingly, the user may move map view 700 to the right while entry point indicator 508 remains stationary so that, in effect, entry point indicator 508 is relocated to the left of its prior location. FIG. 7 shows prior location 702 for entry point indicator 508. Mapping application 112 may have presented entry point indicator 508 at prior location 702, before the user moved map view 700 to the right. In some embodiments, prior location 702 is presented on map view 700 (e.g., as a faded or differently colored version of entry point indicator 508). In other embodiments, prior location 702 is not presented at all and only a single entry point indicator 508 is presented. As shown in FIG. 7, prior location 702 is still shown to be adjacent to parking space 25 in parking lot 212. However, entry point indicator 508 has moved to be adjacent to parking space 22. For example, the user may determine that, in the real world, the entry point represented by entry point indicator 508 is closer to parking space 22 than to parking space 25. For illustration purposes only, parking space 25 is circled with dotted lines to show that it is adjacent to prior location 702. Parking space 22 is shown circled with a solid line to show that it corresponds to the new location for entry point indicator 508.

Figure 8:
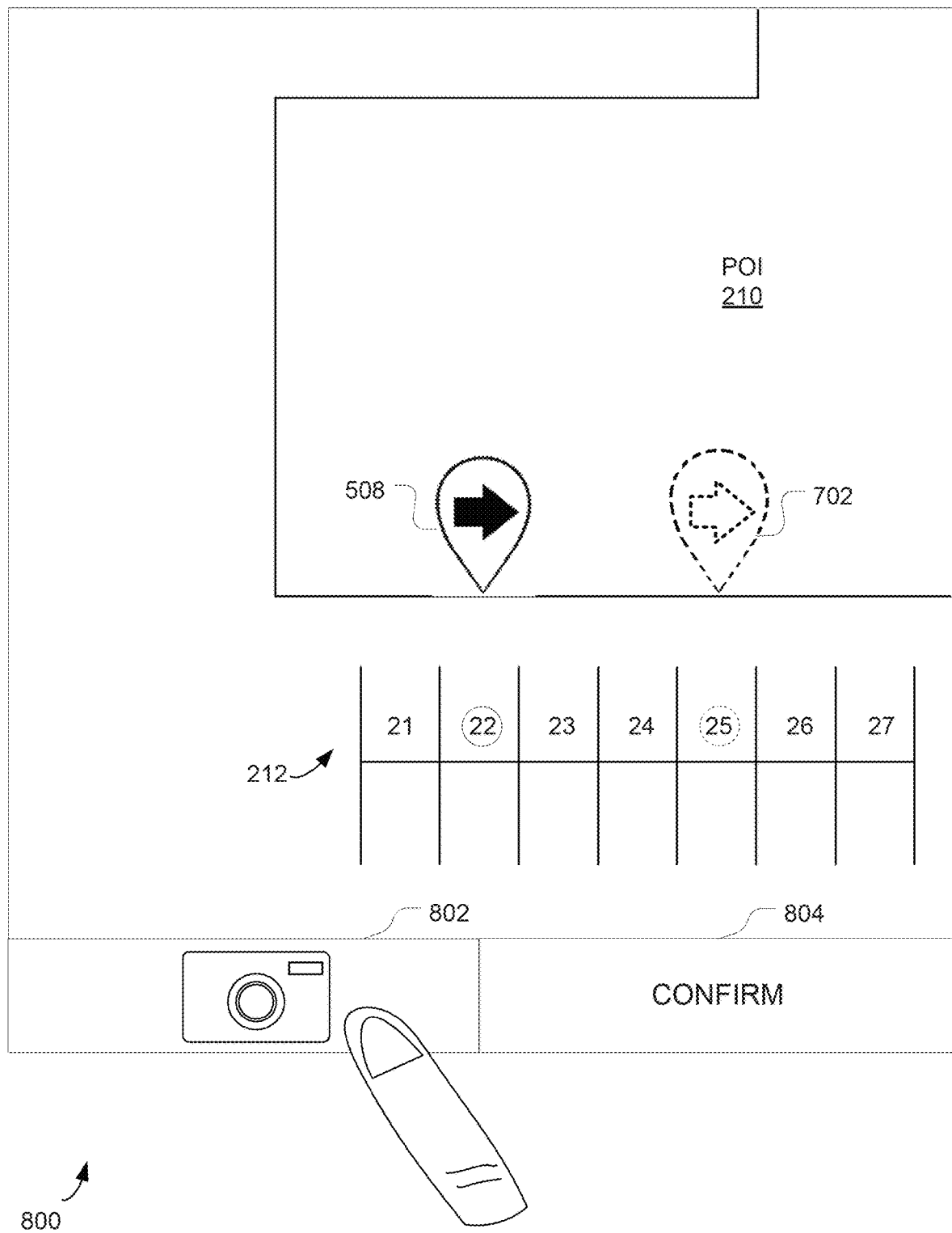
FIG. 8 is a map view that is configured to request confirmation of the entry point edit operation.

The user may move the map around using different touch inputs. The user may move map view 700 several times until the user determines that entry point indicator 508 is in the correct location (e.g., by parking space 22). In some embodiments, mapping application 112 may be configured to wait a threshold amount of time before requesting confirmation of the entry point edit operation. For example, three seconds after the user ceases to move map view 700, mapping application 112 may present map view 800 of FIG. 8. FIG. 8 shows a map view 800 that is configured to request confirmation of the entry point edit operation. Map view 800 is similar to map view 700 except that map view 800 includes media capture control 802 and confirmation control 804.

In some embodiments, map view 800 includes media capture control 802. Mapping application 112 may be configured to present media capture control 802 that enables a user to provide images or videos as additional documentation supporting the user's suggestion to update the entry point. Mapping application 112 may also be configured to present confirmation control 804. A user may select confirmation control 804 to complete the entry point process. However, as shown in FIG. 8, the user selects media capture control 802.

Figure 9:
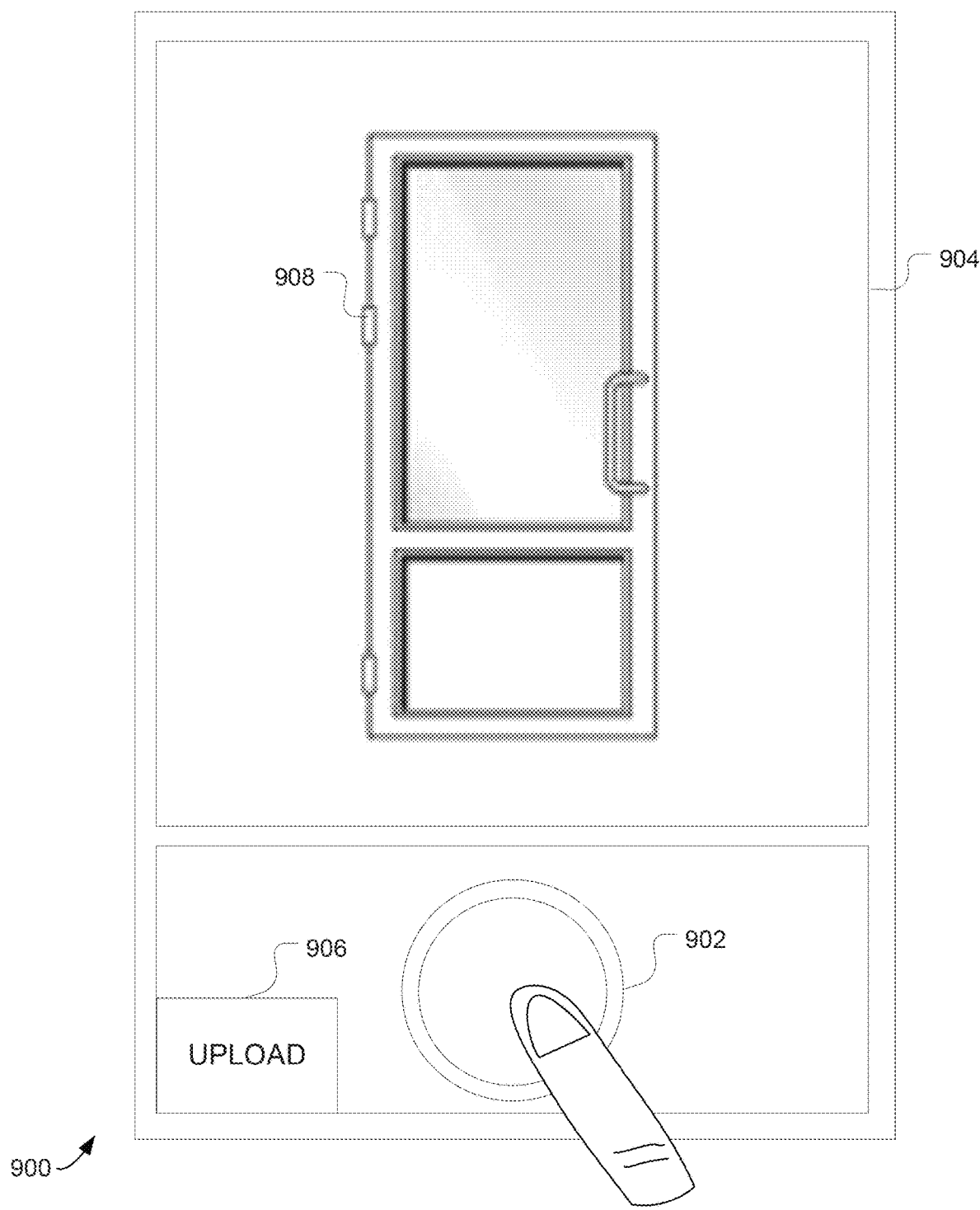
FIG. 9 is a media capture interface that can be used to capture media to include in an entry point update submission.

In response to the user selecting media capture control 802, mapping application 112 may be configured to present media capture interface 900. FIG. 9 shows a media capture interface 900 that can be used to capture media such as photos or videos to include in an entry point update submission. In some embodiments, media capture interface 900 may be an interface of media capture application 114, shown in FIG. 1. In some embodiments, mapping application 112 may cause media application 114 to present media capture interface 900 in response to the user selecting media capture control 802 (shown in FIG. 8).

As shown in FIG. 9, media capture interface 900 includes media capture control 902 and media capture presentation area 904. Media capture presentation area 904 may be similar to a camera viewfinder or digital camera image capture view that shows a view of an object which the user wishes to photograph or capture on video. For example, the user may move mobile device 110 around to the real-world entry point so that the entry point is viewable in media capture presentation area 904. The entry point may present in media capture presentation area 904. For example, FIG. 9 shows media capture presentation area 904 to present door 908. Door 908 may be the entry point that is in a different location to that presented by mapping application 112 using entry point indicator 508, as discussed above. The user may interact with media capture control 902 to take, for example, a photo of door 908. In some embodiments, media capture application 114 may generate location data (e.g., EXIF data) to associate with the photo. Media capture application 114 may provide the location data to mapping application 112 along with the captured photo of door 908.

Also, in other embodiments, media capture application 114 may present media upload control 906. The user may touch media upload control 906 and user other interfaces (not shown) of media application 114 to upload previously captured images or video.

Figure 10:
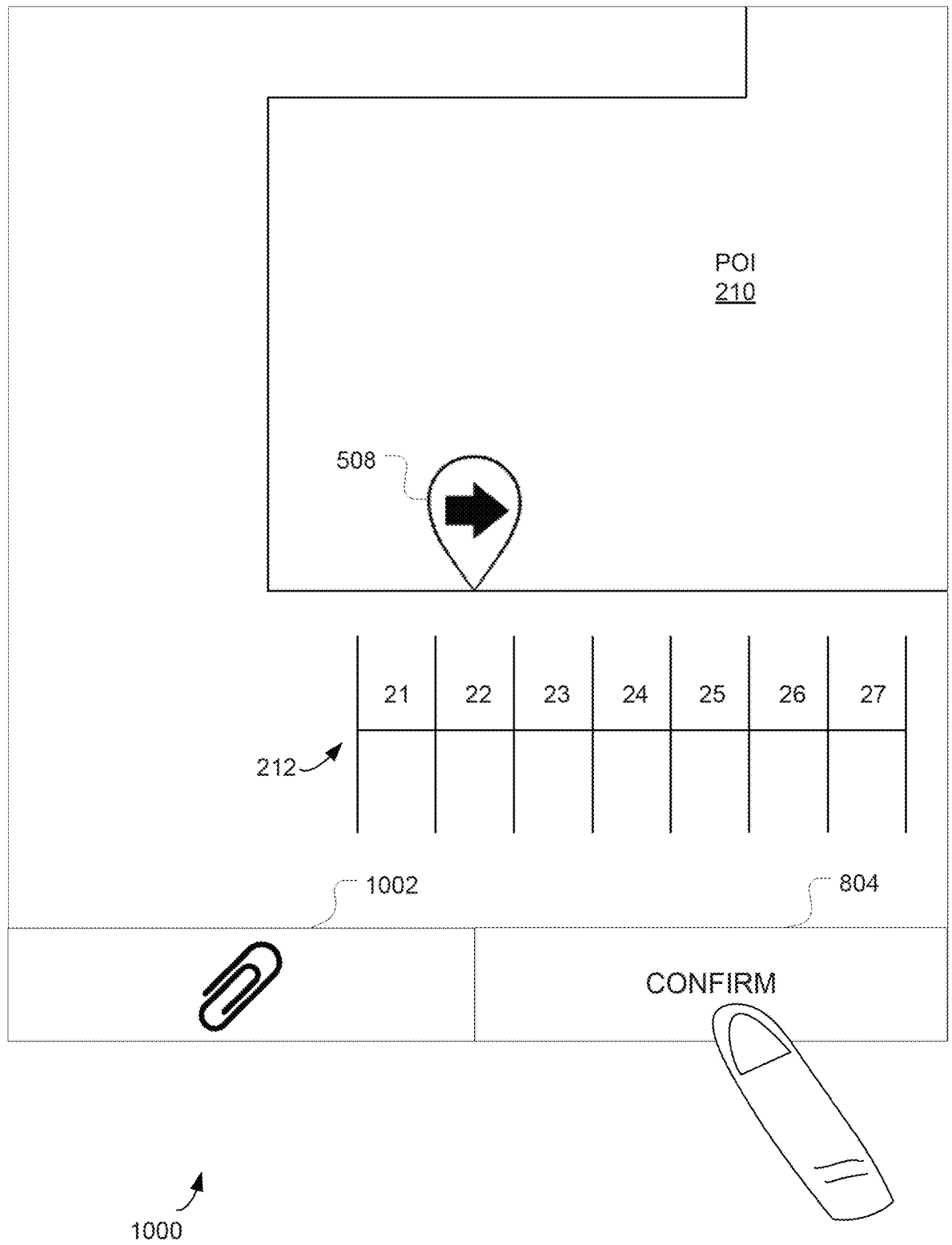
FIG. 10 is a map view that indicates whether any media are attached to an entry point update submission.

In some embodiments, once the user has captured media for the entry point, media application 114 provides the media to mapping application 112. In response, mapping application 112 presents map view 1000. FIG. 10 shows map view 1000 that indicates whether any media are attached to an entry point update submission. Map view 1000 may be similar to map view 800 of FIG. 8. However, in contrast to map view 800, map view 1000 includes attachment control 1002 instead of media capture control 802. Attachment control 1002 indicates that the user has already captured media that is included in the pending entry point edit submission. Mapping application 112 may be configured to return the user to image application 114 if the user interacts with attachment control 1002 and wishes to review the capture media or make other changes. In some embodiments, on map view 1000, the user interacts with confirmation control 804.

Figure 11:
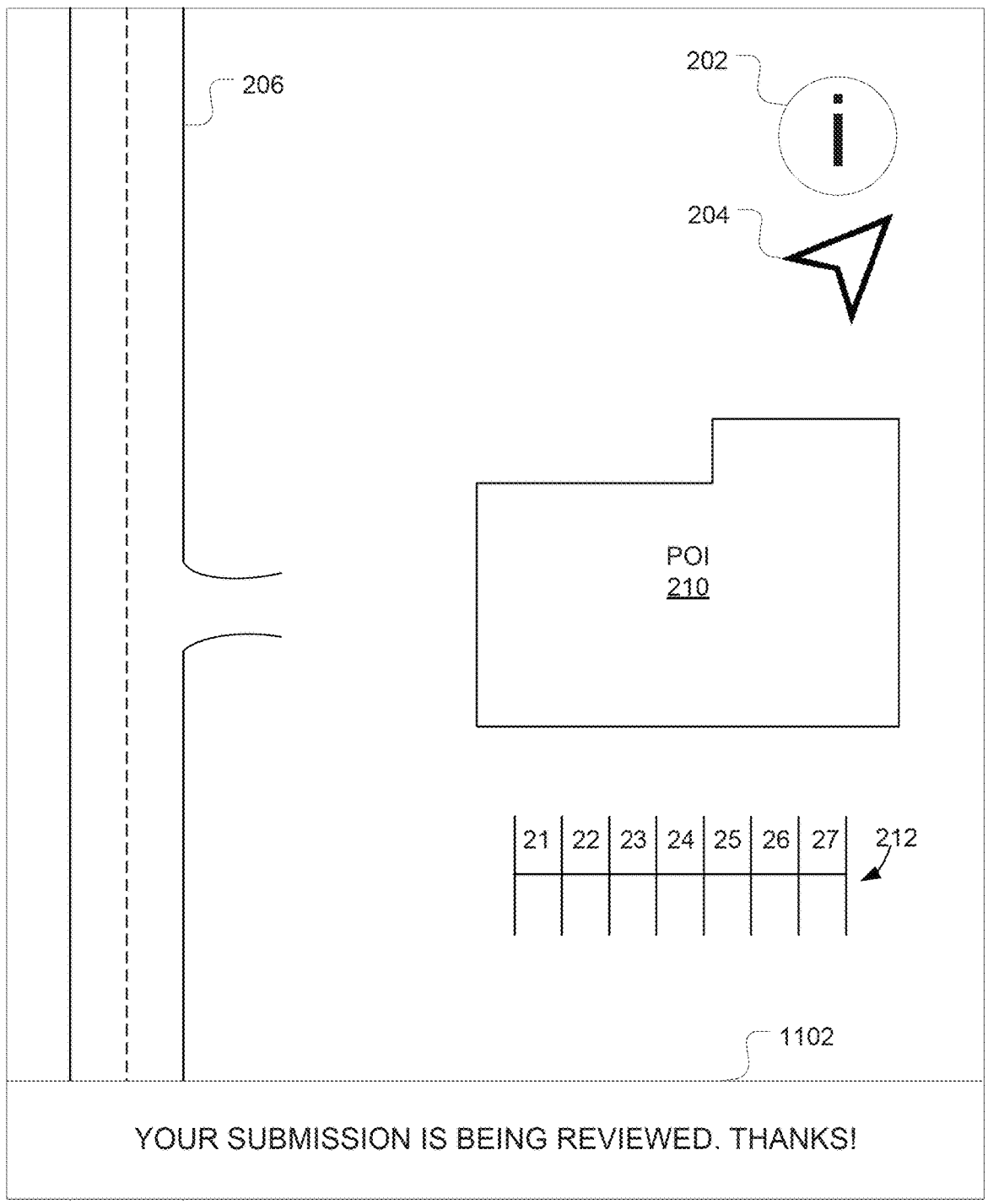
FIG. 11 is a map view which presents the map area shown in FIG. 2 with a submission confirmation message.

In response to the interaction with confirmation control 804, mapping application 112 may be configured to present map view 1100. FIG. 11 shows map view 1100 which presents the map area shown in FIG. 2 with a submission confirmation message. As shown in FIG. 11, map view 1100 is similar to map view 200 of FIG. 2 except that map view 1100 shows confirmation message 1102. For example, confirmation message may inform the user that the user's entry point edit has been received and will be reviewed.

Figure 12:
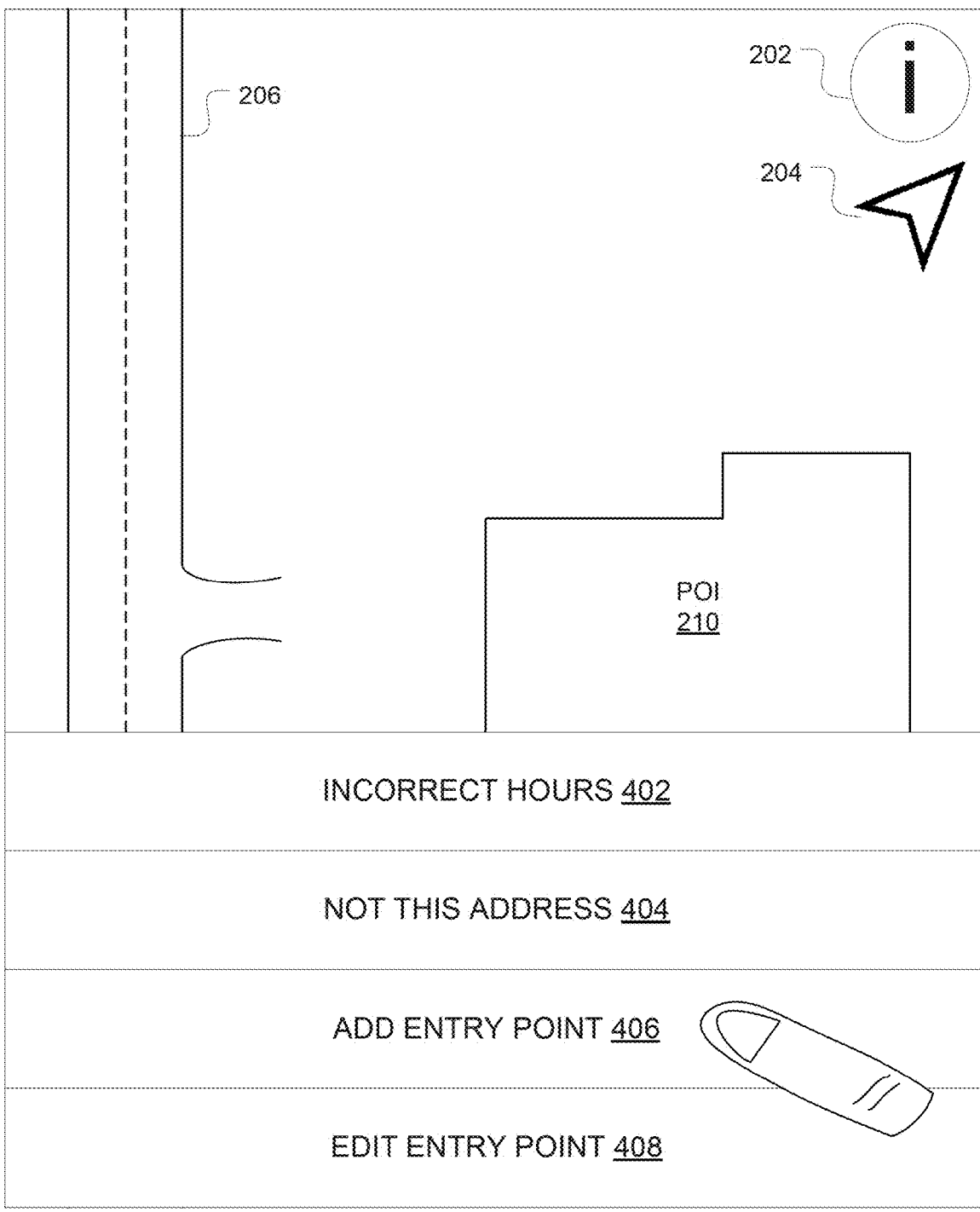
FIG. 12 is a map view by which a mapping application may be configured to present additional interactive controls in response to receiving user input.

FIG. 12 shows a map view 1200 that is presented in response to a user selecting feedback control 202. Map view 1200 is similar to map view 400, except that the user selects add entry point control 406. For example, the user may determine that mapping application 112 does not present an entry point that exists on POI 210. The user may determine, for example, that the entry point is missing on map view 500.

Figure 13:
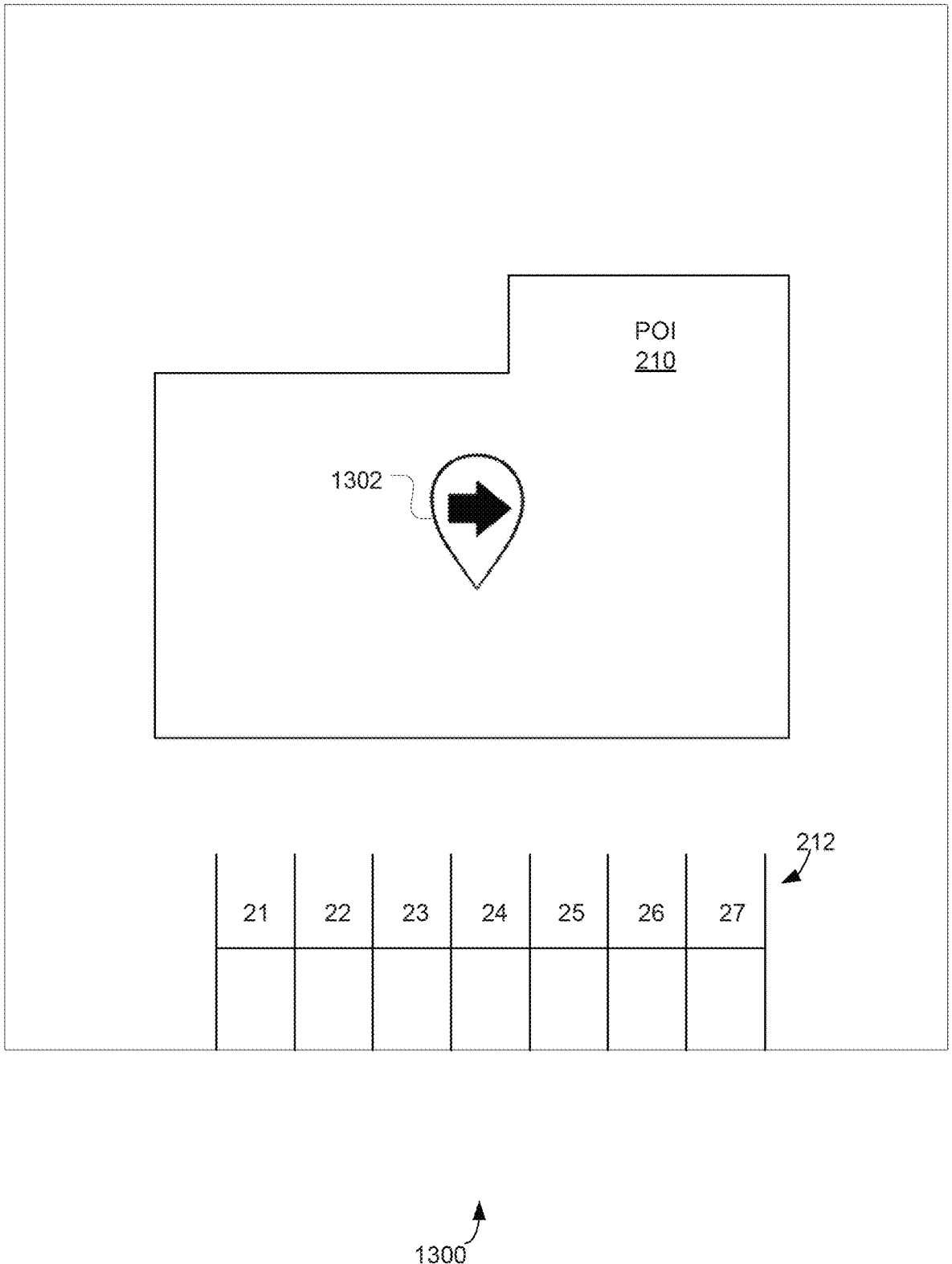
FIG. 13 is a map view showing a new entry point indicator included in the map view.

In response to the user selecting add entry point control 406, mapping application may be configured to show map view 1300. FIG. 13 is a map view 1300 showing a new entry point indicator included in the map view.

As shown in FIG. 13, in some embodiments, mapping application 112 may be configured to present POI 210 in a center of map view 1300. Mapping application 112 may also present candidate entry point indicator 1302 in the center of map view 1300. In other words, candidate entry point indicator 1302 may be superimposed over the center of POI 210, itself in the center of map view 1300. Mapping application 112 may be configured to focus on POI 210 by zooming in to the presentation of POI 210. Adjacent map features, such as parking lot 212 may be presented if they fit into map view 1300 at the particular zoom level at which POI 210 is presented.

Similar to entry point indicator 508 as discussed above with respect to FIGS. 6-8, mapping application 112 may hold candidate entry point indicator 1302 in a fixed position in the center of map view 1300. Concurrently, mapping application 112 may enable map view 1300 to be movable in response to user input.

Figure 14:
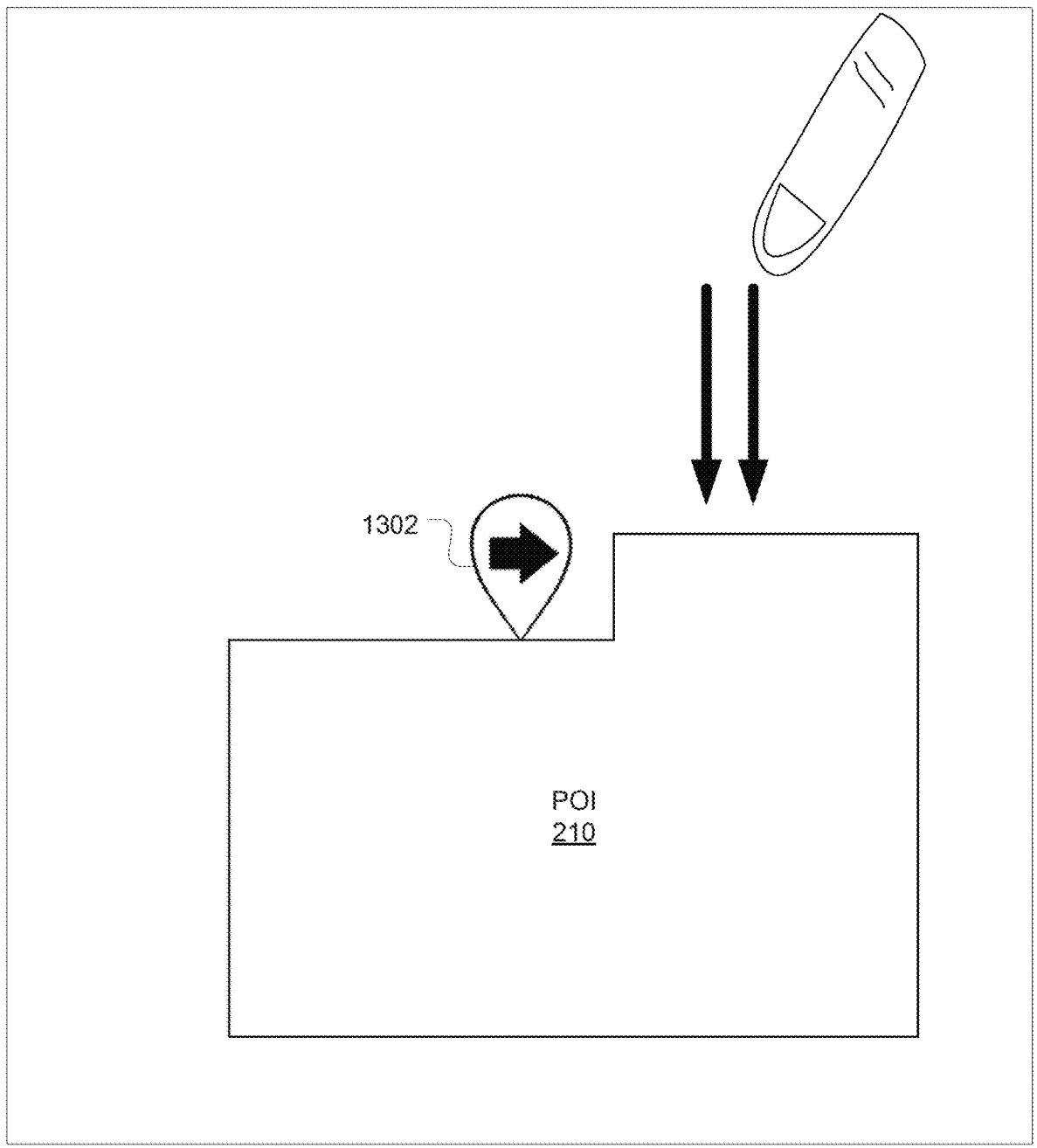
FIG. 14 shows map view as a user moves the map to place the new entry point indicator in the correct location.

FIG. 14 shows map view 1400 as a user moves the map to place candidate entry point indicator 1302 in the correct location. Map view 1400 is similar to map view 1300. As shown in FIG. 14, mapping application 112 may hold candidate entry point indicator 1302 in a fixed position as the user moves map view 1400 downward. For example, the user may determine that POI 210 has a new entry point in a north boundary or wall that is not reflected in the map views shown by mapping application 112. To move candidate entry point indicator 1302 upward (or northward) on map view 1400, the user may move map view 1400 downward until candidate entry point indicator 1302 is in the correct position as perceived by the user.

Figure 15:
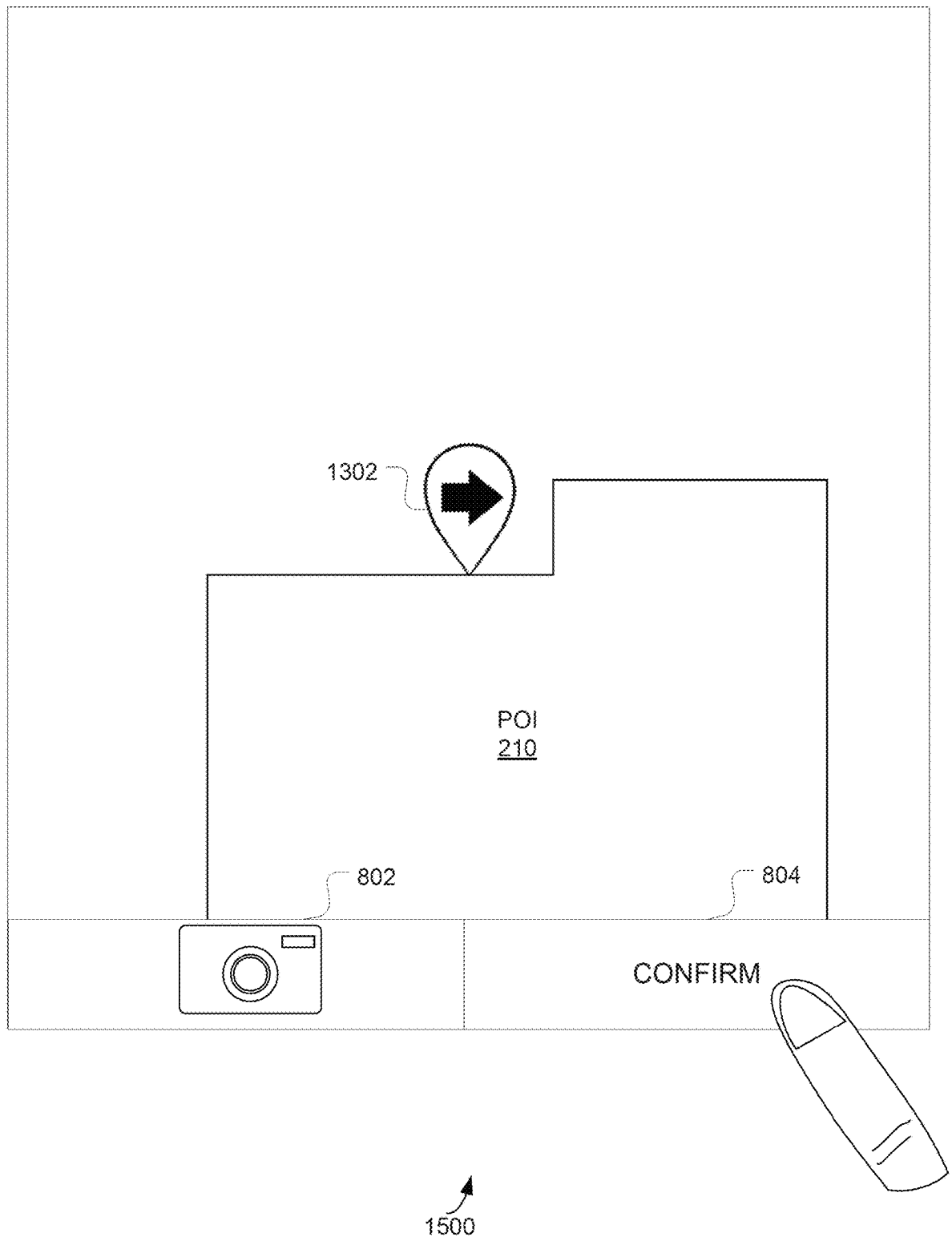
FIG. 15 shows a map view that requests confirmation of the entry point add operation.

The user may move map view 1400 around several times using different touch inputs until the user determines that candidate entry point indicator 1302 is in the correct location. In some embodiments, mapping application 112 may be configured to wait a threshold amount of time before requesting confirmation of the entry point add operation. For example, three seconds after the user ceases to move map view 1400, mapping application 112 may present map view 1500. FIG. 15 shows map view 1500 that requests confirmation of the entry point add operation. In some embodiments, map view 1500 includes media capture control 802 and confirmation control 804. These are similar to media capture control 802 and confirmation control 804 shown in FIG. 8. In some embodiments, the user selects confirmation control 804 on map view 1500. In other embodiments, the user may select media capture control 802 and proceed to, for example, media capture interface 900 that can be used to capture media to attach to the entry point add submission.

Figure 16:
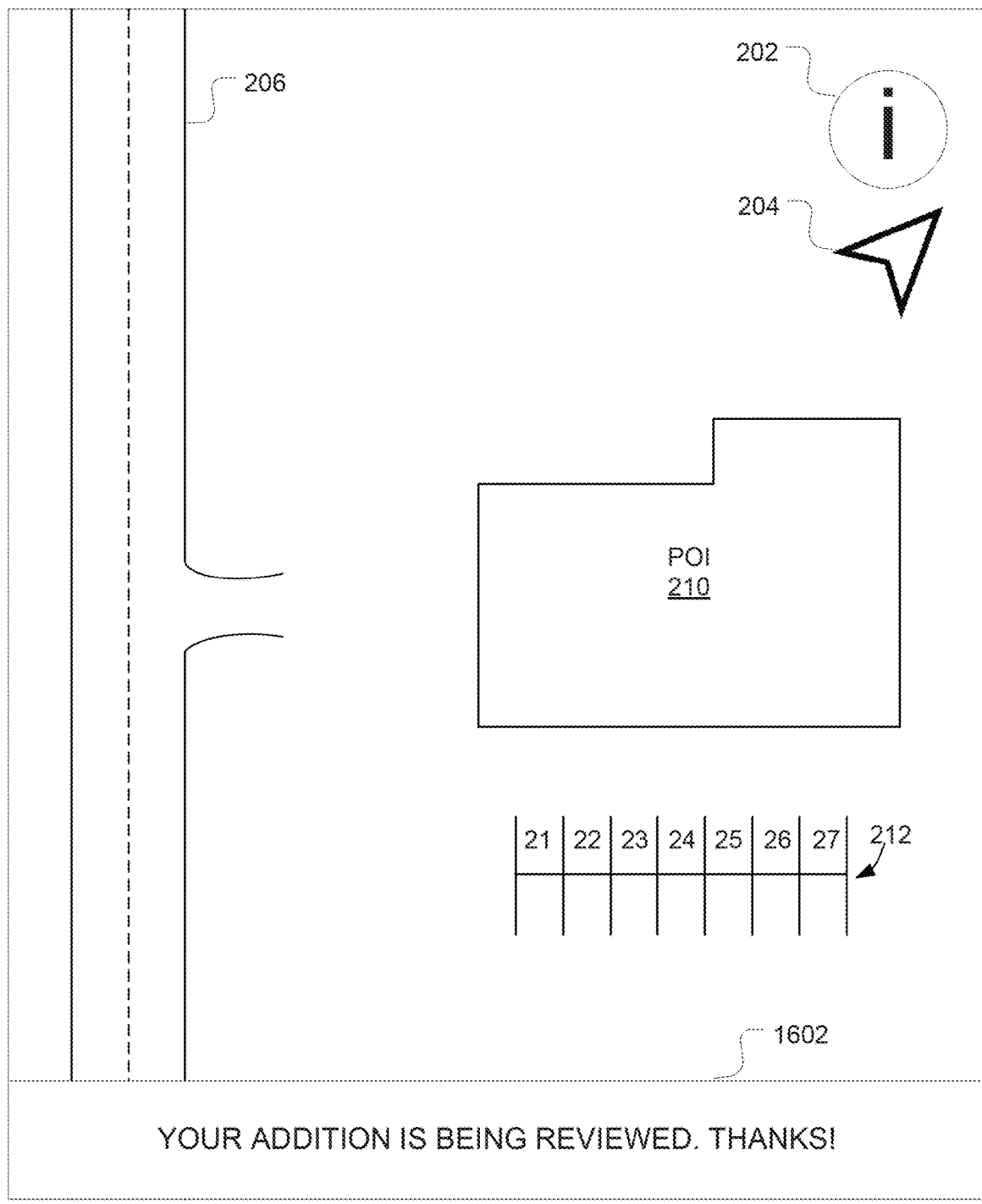
FIG. 16 shows a map view which may return the user to a presentation similar to map view of FIG. 2 after an entry point add submission.

In response to the user selecting confirmation control 804 on map view 1500, mapping application 112 may be configured to present map view 1600. FIG. 16 shows map view 1600 which may return the user to a presentation similar to map view 200 of FIG. 2. Map view 1600 is similar to map view 200 except that confirmation message 1602 is included in map view 1600. For example, confirmation message 1602 may indicate that the user's entry point addition has been received and is being reviewed.

Example Processes

To enable the reader to obtain a clear understanding of the technological concepts described herein, the following processes describe specific steps performed in a specific order. However, one or more of the steps of a particular process may be rearranged and/or omitted while remaining within the contemplated scope of the technology disclosed herein. Moreover, different processes, and/or steps thereof, may be combined, recombined, rearranged, omitted, and/or executed in parallel to create different process flows that are also within the contemplated scope of the technology disclosed herein. Additionally, while the processes below may omit or briefly summarize some of the details of the technologies disclosed herein for clarity, the details described in the paragraphs above may be combined with the process steps described below to get a more complete and comprehensive understanding of these processes and the technologies disclosed herein.

Figure 17:
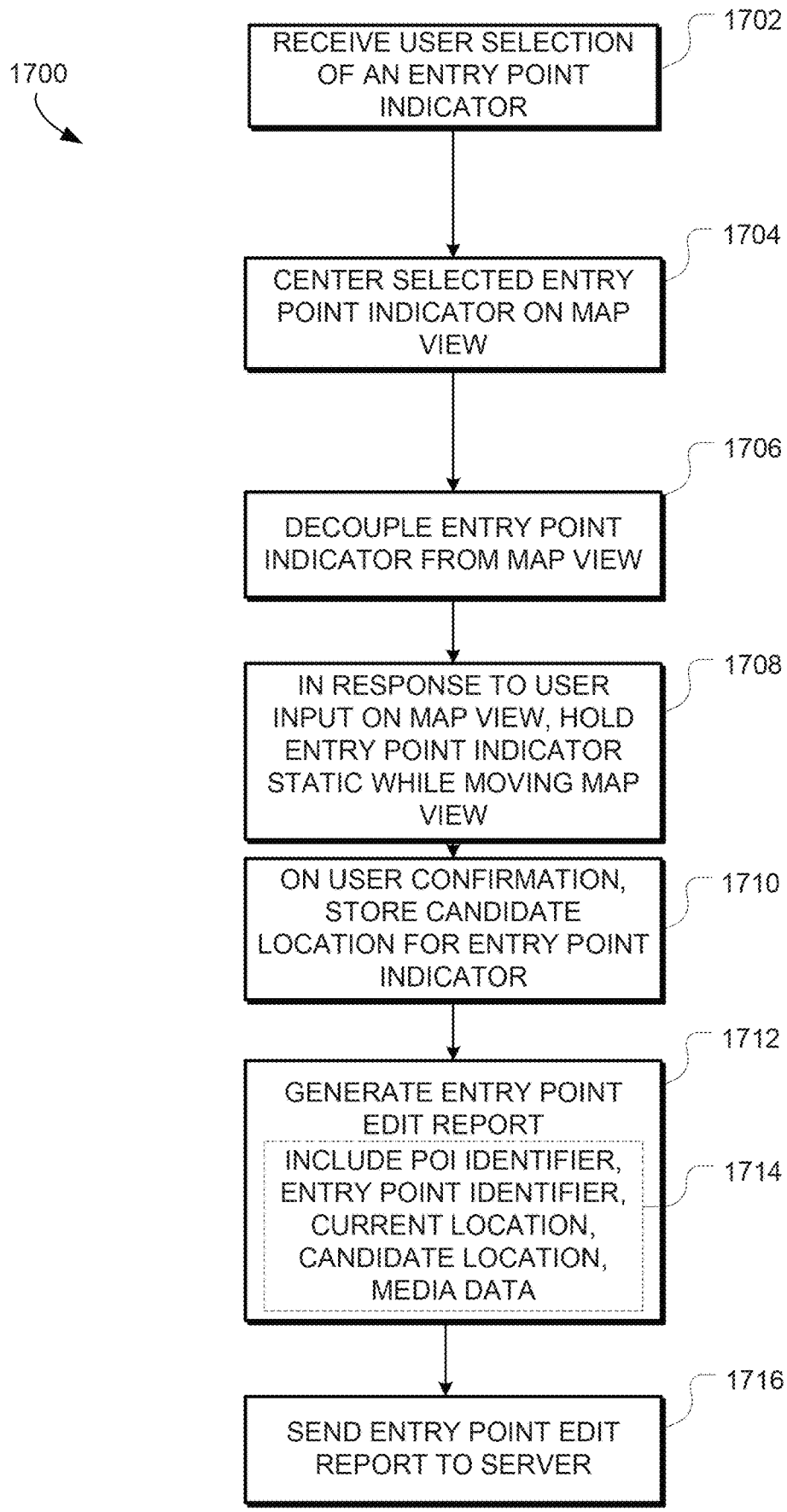
FIG. 17 is flow diagram of an example process by which a mapping application processes entry point edits submitted by a user.

FIG. 17 is a flow diagram 1700 illustrating an example process by which mapping application 112 processes entry point edits submitted by a user.

As shown in FIG. 17, at step 1702, mapping application 112 receives user selection of an entry point indicator. For example, the user may select a POI (e.g., POI 210) and activate feedback control 202 (shown in FIG. 2). The user may proceed through map views 300 and 400 (shown in FIGS. 3 and 4) to arrive at map view 500 (shown in FIG. 5). Mapping application 112 may show all the entry points to POI 210 on map view 500. The user may select an entry point indicator to edit, such as entry point indicator 508.

In response to the selection, at step 1704, mapping application 112 may be configured to center the selected entry point indicator on the map view. For example, mapping application 112 may center entry point indicator 508 on map view 600, as shown in FIG. 6. Mapping application 112 may also zoom in on entry point indicator 508.

At step 1706, mapping application 112 may be configured to decouple the selected entry point indicator from the map view. As noted above, mapping application 112 may present maps using map views that are rendered on a touch-sensitive display screen of, for example, mobile device 110. A map view may enable a user to touch the display screen to pan and zoom the map to view different areas. By default, every map feature being presented may move with the user's touch input. However, as indicated at step 1706, mapping application 112 may decouple or separate the selected entry point indicator from the map view. The entry point indicator may be held stationary (e.g., in the center of the map view) while the user is able to move the map freely.

At step 1708, mapping application 112 determines that the user is providing input on the map view. For example, mapping application 112 determines that the user has moved the map view under the entry point indicator. The entry point indicator now lies on a new location with respect to the map view. Mapping application 112 may determine that the user input has completed or ceased. Mapping application 112 may wait for a threshold amount of time. In some embodiments, mapping application 112 may store the new location for the entry point indicator as shown at step 1710. The stored location may be a candidate location for the entry point. The candidate location may be reviewed (e.g., at server device 130) to determine whether it should be considered the correct location for the entry point.

At step 1712, mapping application 112 may be configured to generate an entry point edit report. As part of the entry point edit report and as shown at step 1714, mapping application 112 may include one or more POI identifiers and entry point identifiers. The entry point edit report may include the current location of the entry point. "Current location" may refer to the location that is currently assigned by mapping application 112 to the entry point. This current location may or may not be correct. Additionally, mapping application may include the candidate location, (i.e., the new location specified by the user for the entry point). Moreover, mapping application 112 may include any media attached by the user in the entry point edit report. For example, the user may take photos or video using media capture interface 900. At step 1716, mapping application 112 may be configured to send the entry point edit report to, for example, server device 130.

Figure 18:
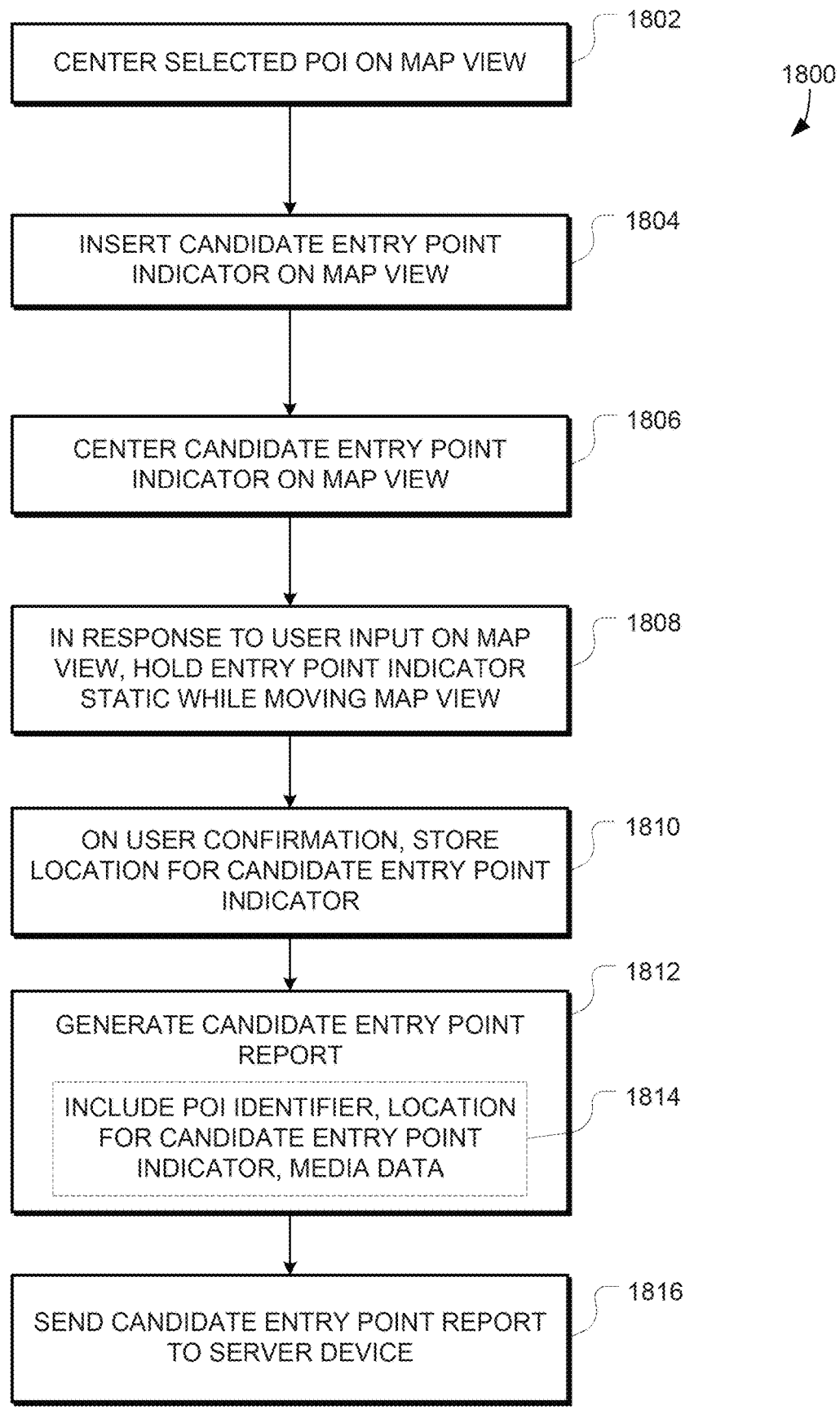
FIG. 18 is flow diagram of an example process by which a mapping application processes entry point additions submitted by a user.

FIG. 18 is a flow diagram 1800 illustrating an example process by which mapping application 112 processes entry point additions submitted by a user.

In some embodiments, mapping application 112 may receive user input indicating that the user wishes to provide an entry point addition for a POI. The user may have selected the POI and then used feedback control 202. In response, mapping application 112 may have presented add entry point control 406. In response to the user selecting add entry point control 406, mapping application 112 may be configured to show map view 1300 (shown in FIG. 13). As part of map view 1300, at step 1802, mapping application 112 may be configured to center the selected POI on map view 1300.

Moreover, at step 1804, mapping application 112 may be configured to insert a candidate entry point indicator on the map view. For example, mapping application 112 may insert candidate entry point indicator 1302 on map view 1300. As shown by step 1806, mapping application 112 may be configured to center the candidate entry point indicator on map view 1300. As a result, mapping application 112 may center both the candidate entry point indicator and the POI on the map view.

At step 1808, mapping application 112 may be configured to hold the candidate entry point indicator stationary at the center of the map view. By contrast, mapping application may configure the map to move freely in response to user input. For example, as described with respect to FIG. 14, the user may move the map while the candidate entry point indicator remains stationary. Thus, the user can conveniently position the candidate entry point indicator relative to the map view without having to cover the candidate entry point indicator with the user's finger.

Mapping application 112 may be configured to determine the user's inputs as the user moves the map around. In some embodiments, mapping application 112 may be configured to determine that the user has ceased moving the map. The user may have placed the candidate entry point indicator in the correct location according to the user. After a threshold period of time (e.g., three seconds), mapping application 112 may request the user to confirm the entry point addition. Once the user provides confirmation (e.g., using confirmation control 804, shown in FIG. 15), mapping application 112 may be configured, at step 1810, to store the location for the candidate entry point indicator.

At step 1812, mapping application 112 may be configured to generate an entry point add report. As part of the entry point add report and as shown at step 1814, mapping application 112 may include one or more POI identifiers and entry point identifiers. Additionally, mapping application may include the candidate location, (i.e., the location specified by the user for the new entry point). Moreover, mapping application 112 may include any media attached by the user in the entry point edit report. For example, the user may take photos or video using media capture interface 900. At step 1816, mapping application 112 may be configured to send the entry point add report to, for example, server device 130.

Figure 19:
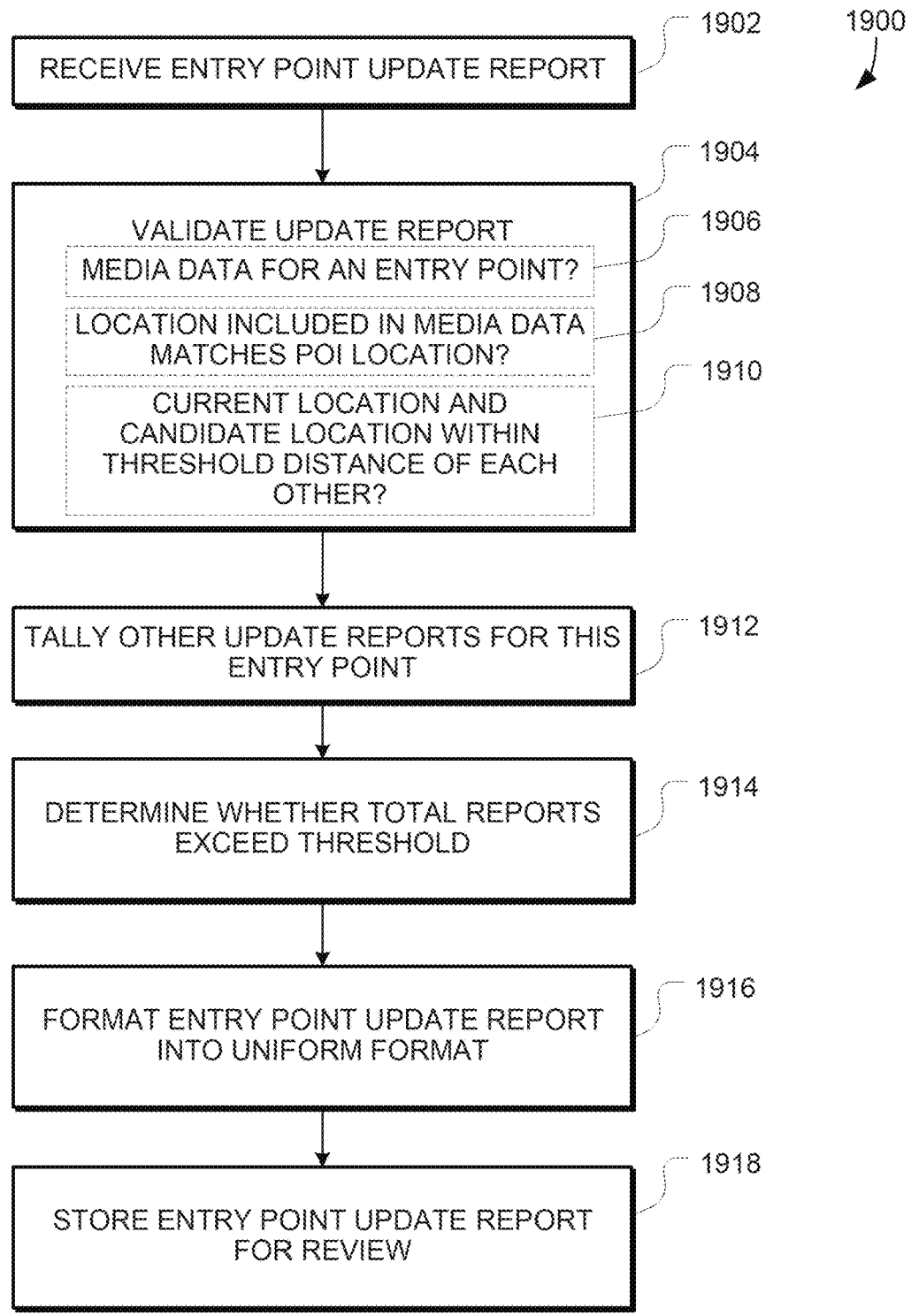
FIG. 19 is flow diagram of an example process by which a server device processes entry point updates (edits and additions) submitted by a user.

FIG. 19 is a flow diagram illustrating an example process 1900 by which server device 130 processes entry point updates (edits and additions) submitted by a user.

As shown in FIG. 19, at step 1902, server device 130 may receive an entry point update report from, for example, mobile device 110. Server device 130 may be configured to analyze any media data provided with the entry point update report. Server device 130 may determine, for example, whether the capture location provided for the media is within a threshold distance of the POI location. Server device 130 may be configured to analyze the entry point update report to determine what entry point updates have been indicated. For example, server device 130 may extract the POI identifier from the entry point update report and correlate the entry point update report with similar reports for the particular POI or the particular entry point at the POI.

At step 1904, server device 130 may be configured to validate the entry point update report to ensure it contains useful data. For example, for an entry point update, server device 130 may determine, at step 1906, whether the media data corresponds to an entry point location. For example, server device 130 may use image analysis techniques to determine that a photo attached to the entry point update report represents a door or entrance (and is not, for example, a photo of a person or some other object). Server device 130 may also compare the received media to any existing media that was previously received for that POI or entry point. For example, server device 130 may use image recognition techniques to determine whether the attached media depicts a door similar to doors that have been depicted in prior media attachments to prior entry point update reports.

Server device 130 may be configured, at step 1908, to determine whether the suggested entry point location (e.g., the location of a new entry point or an edit showing the correct location) corresponds to the location of the POI. If, for example, the distance between the suggested entry point location and the boundaries of the POI exceeds a threshold, server device 130 may be configured to reject the entry point update because the entry point update is not applicable to the POI.

Server device 130 may be configured, at step 1910, to determine whether the suggested entry point location is within a threshold distance of the currently known entry point location. If so, this may support a conclusion that the entry point update report is valid and applicable for an entry point at the POI.

Server device 130 may also be configured to determine if there are prior entry point update reports that involve the currently reported entry point. Server device 130 may be configured to calculate, at step 1912, the total number of entry point update reports for the particular entry point. Server device 130 may be configured to validate (e.g., for a human operator), at step 1914, that the current entry point update report exceeds a threshold number of existing entry point update reports that cite the same entry point. In other words, a number of users may have reported that mapping application 112 is presenting incorrect data for this entry point.

Server device 130 may receive entry point update reports from multiple different types of devices (e.g., mobile devices, desktop computing devices, smartwatches etc.). These devices may use different operating systems and generate different types of files for the entry point update report. Similarly, mapping application 112 may present the map UI through another application (e.g., another mobile application or a web browser) that may generate the entry point update report in its own format. Server device 130 may also be configured, at step 1916 to format the entry point update report into a standard format that is readable by another device or a human operator. At step 1918, server device 130 may store the entry point update report for review (e.g. by a map review team or other computing device).

Graphical User Interfaces

This disclosure above describes various Graphical User Interfaces (GUIs) for implementing various features, processes or workflows. These GUIs can be presented on a variety of electronic devices including but not limited to laptop computers, desktop computers, computer terminals, television systems, tablet computers, e-book readers and smart phones. One or more of these electronic devices can include a touch-sensitive surface. The touch-sensitive surface can process multiple simultaneous points of input, including processing data related to the pressure, degree or position of each point of input. Such processing can facilitate gestures with multiple fingers, including pinching and swiping.

When the disclosure refers to "select" or "selecting" user interface elements in a GUI, these terms are understood to include clicking or "hovering" with a mouse or other input device over a user interface element, or touching, tapping or gesturing with one or more fingers or stylus on a user interface element. User interface elements can be virtual buttons, menus, selectors, switches, sliders, scrubbers, knobs, thumbnails, links, icons, radio buttons, checkboxes and any other mechanism for receiving input from, or providing feedback to a user.

Privacy

As described above, one aspect of the present technology is the gathering and use of data available from various sources to present user interfaces for providing updates to entry point data for a point of interest. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to present user interfaces for providing updates to entry point data for a point of interest.

Further, other uses for personal information data that benefit the user are also contemplated by the present disclosure. For instance, health and fitness data may be used to provide insights into a user's general wellness or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of user interfaces for providing updates to entry point data for a point of interest, the present technology can be configured to allow users to select to "opt in" or "opt out" of participation in the collection of personal information data during registration for services or anytime thereafter. In another example, user can opt not to provide any entry point updates or any location data. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, user interfaces for entry point updates can be provided based on non-personal information data or a bare minimum amount of personal information, such as the content being requested by the device associated with a user, other non-personal information available to a mapping application, or publicly available information.

Example System Architecture

Figure 20:
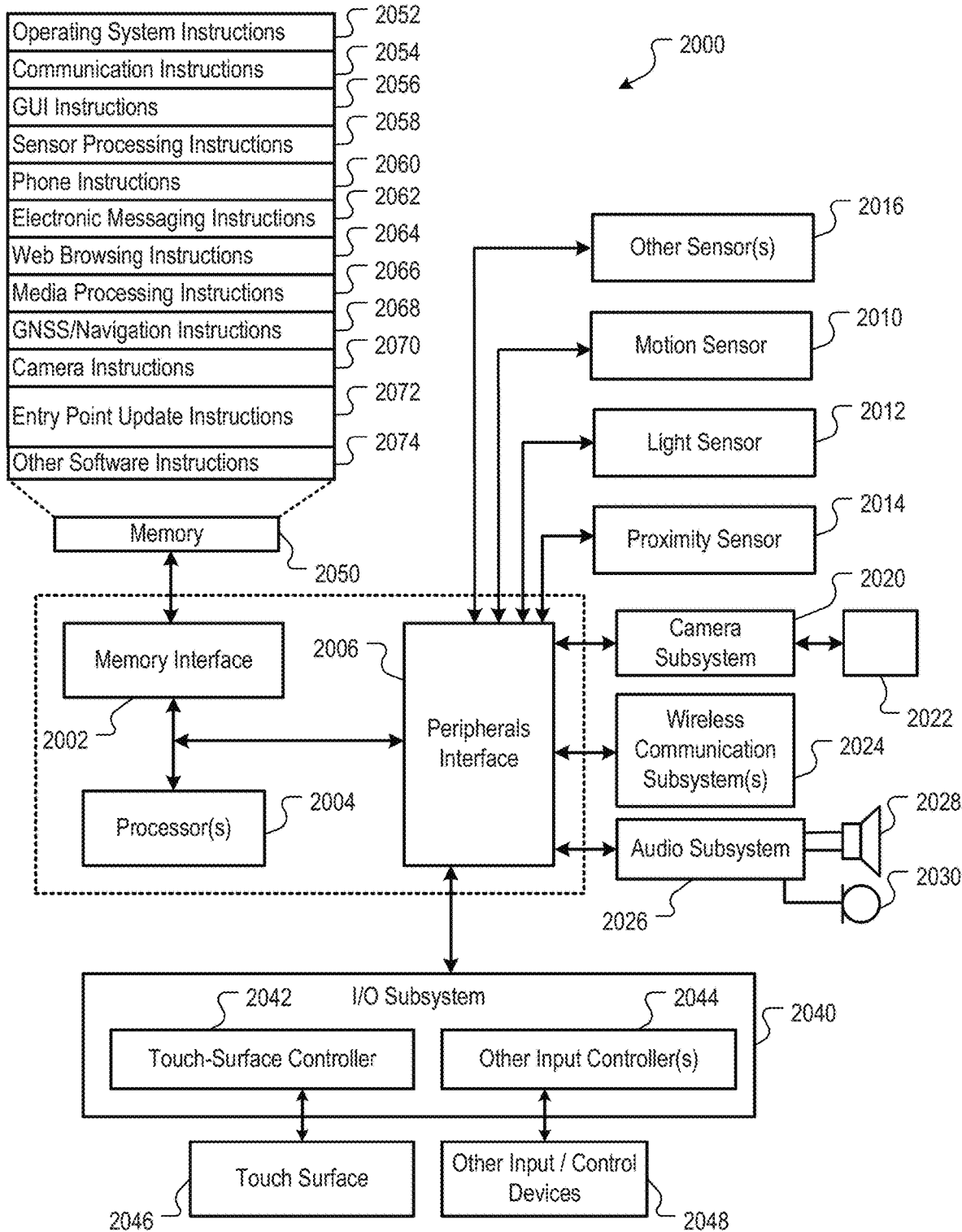
FIG. 20 is a block diagram of an example computing device that can implement the features and processes of FIGS. 1-19.

FIG. 20 is a block diagram of an example computing device 2000 that can implement the features and processes of FIGS. 1-19. The computing device 2000 can include a memory interface 2002, one or more data processors, image processors and/or central processing units 2004, and a peripherals interface 2006. The memory interface 2002, the one or more processors 2004 and/or the peripherals interface 2006 can be separate components or can be integrated in one or more integrated circuits. The various components in the computing device 2000 can be coupled by one or more communication buses or signal lines.

Sensors, devices, and subsystems can be coupled to the peripherals interface 2006 to facilitate multiple functionalities. For example, a motion sensor 2010, a light sensor 2012, and a proximity sensor 2014 can be coupled to the peripherals interface 2006 to facilitate orientation, lighting, and proximity functions. Other sensors 2016 can also be connected to the peripherals interface 2006, such as a global navigation satellite system (GNSS) (e.g., GPS receiver), a temperature sensor, a biometric sensor, magnetometer or other sensing device, to facilitate related functionalities.

A camera subsystem 2020 and an optical sensor 2022, e.g., a charged coupled device (CCD) or a complementary metal-oxide semiconductor (CMOS) optical sensor, can be utilized to facilitate camera functions, such as recording photographs and video clips. The camera subsystem 2020 and the optical sensor 2022 can be used to collect images of a user to be used during authentication of a user, e.g., by performing facial recognition analysis.

Communication functions can be facilitated through one or more wireless communication subsystems 2024, which can include radio frequency receivers and transmitters and/or optical (e.g., infrared) receivers and transmitters. The specific design and implementation of the communication subsystem 2024 can depend on the communication network (s) over which the computing device 2000 is intended to operate. For example, the computing device 2000 can include communication subsystems 2024 designed to operate over a GSM network, a GPRS network, an EDGE network, a Wi-Fi or WiMax network, and a Bluetooth™ network. In particular, the wireless communication subsystems 2024 can include hosting protocols such that the device 100 can be configured as a base station for other wireless devices.

An audio subsystem 2026 can be coupled to a speaker 2028 and a microphone 2030 to facilitate voice-enabled functions, such as speaker recognition, voice replication, digital recording, and telephony functions. The audio subsystem 2026 can be configured to facilitate processing voice commands, voiceprinting and voice authentication, for example.

The I/O subsystem 2040 can include a touch-surface controller 2042 and/or other input controller(s) 2044. The touch-surface controller 2042 can be coupled to a touch surface 2046. The touch surface 2046 and touch-surface controller 2042 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch surface 2046.

The other input controller(s) 2044 can be coupled to other input/control devices 2048, such as one or more buttons, rocker switches, thumb-wheel, infrared port, USB port, and/or a pointer device such as a stylus. The one or more buttons (not shown) can include an up/down button for volume control of the speaker 2028 and/or the microphone 2030.

In one implementation, a pressing of the button for a first duration can disengage a lock of the touch surface 2046; and a pressing of the button for a second duration that is longer than the first duration can turn power to the computing device 2000 on or off. Pressing the button for a third duration can activate a voice control, or voice command, module that enables the user to speak commands into the microphone 2030 to cause the device to execute the spoken command. The user can customize a functionality of one or more of the buttons. The touch surface 2046 can, for example, also be used to implement virtual or soft buttons and/or a keyboard.

In some implementations, the computing device 2000 can present recorded audio and/or video files, such as MP3, AAC, and MPEG files. In some implementations, the computing device 2000 can include the functionality of an MP3 player, such as an iPod™.

The memory interface 2002 can be coupled to memory 2050. The memory 2050 can include high-speed random-access memory and/or non-volatile memory, such as one or more magnetic disk storage devices, one or more optical storage devices, and/or flash memory (e.g., NAND, NOR). The memory 2050 can store an operating system 2052, such as Darwin, RTXC, LINUX, UNIX, OS X, WINDOWS, or an embedded operating system such as VxWorks.

The operating system 2052 can include instructions for handling basic system services and for performing hardware dependent tasks. In some implementations, the operating system 2052 can be a kernel (e.g., UNIX kernel). In some implementations, the operating system 2052 can include instructions for performing voice authentication. For example, operating system 2052 can implement the features of providing user interfaces for providing entry point updates as described with reference to FIGS. 1-19.

The memory 2050 can also store communication instructions 2054 to facilitate communicating with one or more additional devices, one or more computers and/or one or more servers. The memory 2050 can include graphical user interface instructions 2056 to facilitate graphic user interface processing; sensor processing instructions 2058 to facilitate sensor-related processing and functions; phone instructions 2060 to facilitate phone-related processes and functions; electronic messaging instructions 2062 to facilitate electronic-messaging related processes and functions; web browsing instructions 2064 to facilitate web browsing-related processes and functions; media processing instructions 2066 to facilitate media processing-related processes and functions; GNSS/Navigation instructions 2068 to facilitate GNSS and navigation-related processes and instructions; and/or camera instructions 2070 to facilitate camera-related processes and functions.

The memory 2050 can store software instructions 2072 to facilitate other processes and functions, such as the entry point update user interface processes and functions as described with reference to FIGS. 1-19.

The memory 2050 can also store other software instructions 2074, such as web video instructions to facilitate web video-related processes and functions; and/or web shopping instructions to facilitate web shopping-related processes and functions. In some implementations, the media processing instructions 2066 are divided into audio processing instructions and video processing instructions to facilitate audio processing-related processes and functions and video processing-related processes and functions, respectively.

Each of the above identified instructions and applications can correspond to a set of instructions for performing one or more functions described above. These instructions need not be implemented as separate software programs, procedures, or modules. The memory 2050 can include additional instructions or fewer instructions. Furthermore, various functions of the computing device 2000 can be implemented in hardware and/or in software, including in one or more signal processing and/or application specific integrated circuits.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

What is claimed is:

1. A method comprising:
   at an electronic device in communication with one or more input devices and a display generation component:
   displaying, via the display generation component, a mapping application including a first point of interest with indications of one or more associated entry points for entering the first point of interest in accordance with entry point data stored for the first point of interest,
   wherein the entry point data for the first point of interest defines (a) the one or more associated entry points for entering the first point of interest and (b) one or more locations corresponding respectively to the one or more associated entry points for the first point of interest;
   while displaying the mapping application, receiving, via the one or more input devices, input requesting modification of the entry point data stored for the first point of interest, the input requesting addition of a user-suggested entry point for entering the first point of interest at a particular location,
   wherein the particular location for the user-suggested entry point is different from the one or more locations corresponding respectively to the one or more associated entry points for entering the first point of interest;
   responsive to receiving the input requesting modification of the entry point data stored for the first point of interest via the addition of the user-suggested entry point and in accordance with a determination that the user-suggested entry point meets validation criteria:
   modifying the entry point data stored for the first point of interest in the map data at least by:
   creating, in the entry point data for the first point of interest, a new entry point for entering the first point of interest with the particular location for the user-suggested entry point, wherein no entry points previously existed for the first point of interest at the particular location in the map data; and
   rendering a map view, via the display generation component, with the first point of interest to include an indication of the user-suggested entry point for entering the first point of interest at the particular location; and
   displaying, by the mapping application, the map view.

2. The method of claim 1, wherein displaying, via the display generation component, a mapping application including a first point of interest with indications of one or more associated entry points for entering the first point of interest further comprises:
   displaying an entry point control; and
   receiving from a user a selection of an entry point and user input for relocating the selected entry point.

3. The method of claim 1, wherein receiving, via the one or more input devices, input requesting modification of the entry point data stored for the first point of interest, the input requesting addition of a user-suggested entry point for entering the first point of interest at a particular location, wherein the particular location for the user-suggested entry point is different from the one or more locations corresponding respectively to the one or more associated entry points for entering the first point of interest comprises:
   providing one or more controls adapted to receive from a user an edit to a particular entry point.

4. The method of claim 3, wherein providing one or more controls adapted to receive from a user an edit to a particular entry point comprises:
   receiving from a user a selection of a particular entry point, the particular entry point being displayed on a map at a first location in the point of interest; and
   based on the input, relocating the particular entry point to a second location in the point of interest.

5. The method of claim 3, wherein providing one or more controls adapted to receive from a user an edit to a particular entry point comprises:
   receiving from a user a selection of a particular entry point, the particular entry point being displayed on a user interface at a first location in the point of interest;
   receiving from the user a command to pan the map while holding the particular entry point in a fixed position in the user interface, thereby relocating the particular entry point in the point of interest; and
   receiving user input indicating that a second location in the point of interest represents a correct location of the particular entry point.

6. The method of claim 5, further comprising:
   responsive to receiving from a user a selection of a particular entry point, adjusting the user interface to center the particular entry point in the user interface.

7. The method of claim 1, further comprising:
   generating an entry point report, the entry point report including one or more of: a point of interest identifier, an entry point identifier, a current entry point location, a user-suggested entry point location, or a photo of an entry point; and
   sending the entry point report to a server device.

8. A non-transitory computer-readable medium including one or more sequences of instructions that, when executed by one or more processors, cause the one or more processors to perform operations comprising:
  at an electronic device in communication with one or more input devices and a display generation component:
  displaying, via the display generation component, a mapping application including a first point of interest with indications of one or more associated entry points for entering the first point of interest in accordance with entry point data stored for the first point of interest,
  wherein the entry point data for the first point of interest defines (a) the one or more associated entry points for entering the first point of interest and (b) one or more locations corresponding respectively to the one or more associated entry points for the first point of interest;
  while displaying the mapping application, receiving, via the one or more input devices, input requesting modification of the entry point data stored for the first point of interest, the input requesting addition of a user-suggested entry point for entering the first point of interest at a particular location,
  wherein the particular location for the user-suggested entry point is different from the one or more locations corresponding respectively to the one or more associated entry points for entering the first point of interest;
  responsive to receiving the input requesting modification of the entry point data stored for the first point of interest via the addition of the user-suggested entry point and in accordance with a determination that the user-suggested entry point meets validation criteria:
    modifying the entry point data stored for the first point of interest in the map data at least by:
      creating, in the entry point data for the first point of interest, a new entry point for entering the first point of interest with the particular location for the user-suggested entry point, wherein no entry points previously existed for the first point of interest at the particular location in the map data; and
      rendering a map view, via the display generation component, with the first point of interest to include an indication of the user-suggested entry point for entering the first point of interest at the particular location; and
    displaying, by the mapping application, the map view.

9. The non-transitory computer-readable medium of claim 8,
  wherein displaying, via the display generation component, a mapping application including a first point of interest with indications of one or more associated entry points for entering the first point of interest further comprises:
    displaying an entry point control; and
    receiving from a user a selection of an entry point and user input for relocating the selected entry point.

10. The non-transitory computer-readable medium of claim 8,
  wherein receiving, via the one or more input devices, input requesting modification of the entry point data stored for the first point of interest, the input requesting addition of a user-suggested entry point for entering the first point of interest at a particular location, wherein the particular location for the user-suggested entry point is different from the one or more locations corresponding respectively to the one or more associated entry points for entering the first point of interest comprises:
    providing one or more controls adapted to receive from a user an edit to a particular entry point.

11. The non-transitory computer-readable medium of claim 10,
  wherein providing one or more controls adapted to receive from a user an edit to a particular entry point comprises:
    receiving from a user a selection of a particular entry point, the particular entry point being displayed on a map at a first location in the point of interest; and
    based on the input, relocating the particular entry point to a second location in the point of interest.

12. The non-transitory computer-readable medium of claim 10,
  wherein providing one or more controls adapted to receive from a user an edit to a particular entry point comprises:
    receiving from a user a selection of a particular entry point, the particular entry point being displayed on a user interface at a first location in the point of interest;
    receiving from the user a command to pan the map while holding the particular entry point in a fixed position in the user interface, thereby relocating the particular entry point in the point of interest; and
    receiving user input indicating that a second location in the point of interest represents a correct location of the particular entry point.

13. The non-transitory computer-readable medium of claim 12, the operations further comprising:
  responsive to receiving from a user a selection of a particular entry point, adjusting the user interface to center the particular entry point in the user interface.

14. The non-transitory computer-readable medium of claim 8, the operations further comprising:
  generating an entry point report, the entry point report including one or more of: a point of interest identifier, an entry point identifier, a current entry point location, a user-suggested entry point location, or a photo of an entry point; and
  sending the entry point report to a server device.

15. A system comprising:
  one or more processors; and
  a non-transitory computer-readable medium including one or more sequences of instructions that, when executed by the one or more processors, cause the one or more processors to perform operations comprising:
  at an electronic device in communication with one or more input devices and a display generation component:
  displaying, via the display generation component, a mapping application including a first point of interest with indications of one or more associated entry points for entering the first point of interest in accordance with entry point data stored for the first point of interest,
  wherein the entry point data for the first point of interest defines (a) the one or more associated entry points for entering the first point of interest and (b) one or more locations corresponding respectively to the one or more associated entry points for the first point of interest;
  while displaying the mapping application, receiving, via the one or more input devices, input requesting modification of the entry point data stored for the first point of interest, the input requesting addition of a user-suggested entry point for entering the first point of interest at a particular location,
  wherein the particular location for the user-suggested entry point is different from the one or more locations corresponding respectively to the one or more associated entry points for entering the first point of interest;

responsive to receiving the input requesting modification of the entry point data stored for the first point of interest via the addition of the user-suggested entry point and in accordance with a determination that the user-suggested entry point meets validation criteria:

modifying the entry point data stored for the first point of interest in the map data at least by:

creating, in the entry point data for the first point of interest, a new entry point for entering the first point of interest with the particular location for the user-suggested entry point, wherein no entry points previously existed for the first point of interest at the particular location in the map data; and rendering a map view, via the display generation component, with the first point of interest to include an indication of the user-suggested entry point for entering the first point of interest at the particular location; and displaying, by the mapping application, the map view.

16. The system of claim 15, wherein displaying, via the display generation component, a mapping application including a first point of interest with indications of one or more associated entry points for entering the first point of interest further comprises:

displaying an entry point control; and receiving from a user a selection of an entry point and user input for relocating the selected entry point.

17. The system of claim 15, wherein receiving, via the one or more input devices, input requesting modification of the entry point data stored for the first point of interest, the input requesting addition of a user-suggested entry point for entering the first point of interest at a particular location, wherein the particular location for the user-suggested entry point is different from the one or more locations corresponding respectively to the one or more associated entry points for entering the first point of interest comprises:

providing one or more controls adapted to receive from a user an edit to a particular entry point.

18. The system of claim 17, wherein providing one or more controls adapted to receive from a user an edit to a particular entry point comprises:

receiving from a user a selection of a particular entry point, the particular entry point being displayed on a map at a first location in the point of interest; and based on the input, relocating the particular entry point to a second location in the point of interest.

19. The system of claim 17, wherein providing one or more controls adapted to receive from a user an edit to a particular entry point comprises:

receiving from a user a selection of a particular entry point, the particular entry point being displayed on a user interface at a first location in the point of interest;

receiving from the user a command to pan the map while holding the particular entry point in a fixed position in the user interface, thereby relocating the particular entry point in the point of interest; and receiving user input indicating that a second location in the point of interest represents a correct location of the particular entry point.

20. The system of claim 15, the operations further comprising:

generating an entry point report, the entry point report including one or more of: a point of interest identifier, an entry point identifier, a current entry point location, a user-suggested entry point location, or a photo of an entry point; and sending the entry point report to a server device.

* * * * *